(12) United States Patent
Yoon et al.

(10) Patent No.: US 9,867,516 B2
(45) Date of Patent: *Jan. 16, 2018

(54) ROBOT CLEANER AND METHOD FOR CONTROLLING THE SAME

(71) Applicant: SAMSUNG ELECTRONICS CO., LTD., Suwon-si, Gyeonggi-do (KR)

(72) Inventors: Sang Sik Yoon, Suwon-si (KR); Woo Ram Chung, Seoul (KR); Kyu Sun Han, Suwon-si (KR); Jun Pyo Hong, Suwon-si (KR); Jun Hwa Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,616

(22) Filed: Oct. 2, 2015

(65) Prior Publication Data

US 2016/0022108 A1 Jan. 28, 2016

Related U.S. Application Data

(63) Continuation of application No. 13/652,853, filed on Oct. 16, 2012, now Pat. No. 9,173,539.

(30) Foreign Application Priority Data

Oct. 18, 2011 (KR) ........................ 10-2011-0106698
Mar. 5, 2012 (KR) ........................ 10-2012-0022328

(51) Int. Cl.
*A47L 11/40* (2006.01)
*G05D 1/02* (2006.01)
(Continued)

(52) U.S. Cl.
CPC ......... *A47L 11/4011* (2013.01); *A47L 9/0488* (2013.01); *A47L 11/20* (2013.01);
(Continued)

(58) Field of Classification Search
CPC ............. A47L 2201/04; A47L 2201/06; A47L 2201/00; A47L 2201/02; A47L 2201/022;
(Continued)

(56) References Cited

U.S. PATENT DOCUMENTS 5,309,592 A    5/1994    Hiratsuka
5,341,540 A *   8/1994    Soupert ............... A47L 11/4011
                                                      15/319

(Continued)

FOREIGN PATENT DOCUMENTS

CN            1586384       3/2005
CN            1853549       11/2006
(Continued)

OTHER PUBLICATIONS

Machine translation of JP H0588472 U.*
(Continued)

*Primary Examiner* — Abby Lin
(74) *Attorney, Agent, or Firm* — Staas & Halsey LLP

(57) ABSTRACT

Disclosed are a robot cleaner and a method for controlling the same, capable of controlling a travelling or cleaning pattern of a robot cleaner in accordance with extension and retraction operations of an auxiliary cleaning tool to perform an efficient cleaning operation. The robot cleaner includes a plurality of auxiliary cleaning units mounted to a bottom of the robot cleaner such that the auxiliary cleaning units are extendable and retractable, and a control unit to extend the auxiliary cleaning units while travelling in a wall tracing manner along the periphery of the cleaning region and/or when an obstacle is sensed, and to retract the auxiliary (Continued)

cleaning units while the robot cleaner travels in an inner portion of the cleaning region when traveling of the periphery of the cleaning region is finished.

16 Claims, 24 Drawing Sheets

(51) Int. Cl.
    *A47L 9/04*     (2006.01)
    *A47L 11/20*     (2006.01)
    *A47L 11/24*     (2006.01)
    *A47L 11/33*     (2006.01)
    *B25J 9/00*     (2006.01)

(52) U.S. Cl.
    CPC ............... *A47L 11/24* (2013.01); *A47L 11/33* (2013.01); *A47L 11/4036* (2013.01); *A47L 11/4055* (2013.01); *A47L 11/4061* (2013.01); *G05D 1/0219* (2013.01); *A47L 2201/04* (2013.01); *A47L 2201/06* (2013.01); *B25J 9/0003* (2013.01); *G05B 2219/45098* (2013.01); *G05D 2201/0215* (2013.01)

(58) Field of Classification Search
    CPC ......... A47L 2201/024; A47L 2201/025; A47L 2201/028; A47L 11/33; A47L 11/4055; A47L 11/20; A47L 11/24; A47L 11/4036; A47L 11/4061; A47L 9/0488; A47L 11/4011; G05B 2219/45098; G05B 1/0219; B25J 9/0003; G05D 2201/0215
    See application file for complete search history.

(56) References Cited

U.S. PATENT DOCUMENTS

| | | | |
|---|---|---|---|
| 5,485,645 | A | 1/1996 | Ohtsuki |
| 7,610,651 | B2 * | 11/2009 | Baek ........................ A47L 5/14 15/345 |
| 8,855,914 | B1 | 10/2014 | Alexander et al. |
| 9,173,539 | B2 * | 11/2015 | Yoon ........................ A47L 11/33 |
| 2005/0166355 | A1 | 8/2005 | Tani |
| 2005/0171644 | A1 | 8/2005 | Tani |
| 2007/0032904 | A1 | 2/2007 | Kawagoe et al. |
| 2012/0079670 | A1 | 4/2012 | Yoon et al. |
| 2014/0150820 | A1 * | 6/2014 | Yoo ........................ A47L 9/009 134/6 |

FOREIGN PATENT DOCUMENTS

| | | |
|---|---|---|
| CN | 201070763 | 6/2008 |
| CN | 101313829 | 12/2008 |
| CN | 101606838 | 12/2009 |
| CN | 102113853 | 7/2011 |
| EP | 2 727 237 A2 | 6/2014 |
| JP | 62-292124 | 12/1987 |
| JP | 5-88472 | 12/1993 |
| JP | 7-155273 | 6/1995 |
| JP | 2005-6857 | 1/2005 |
| KR | 10-2007-0107956 | 11/2007 |

OTHER PUBLICATIONS

Machine translation of kr20070107958A.*
English machine translation of KR 1020090107956 (original korean was provided in previous IDS).*
U.S. Office Action dated Feb. 6, 2015 in copending U.S. Appl. No. 13/652,853.
U.S. Notice of Allowance dated Jun. 30, 2015 in copending U.S. Appl. No. 13/652,853.
U.S. Appl. No. 13/652,853, filed Oct. 16, 2012, Sang Sik Yoon, Samsung Electronics Co., Lt.d.
Chinese Office Action dated Dec. 31, 2015 in corresponding Chinese Patent Application No. 201210397254.2.
Extended European Search Report dated Mar. 31, 2016 in corresponding European Patent Application No. 12188989.3.
Chinese Notice of Allowance dated Aug. 26, 2016 in corresponding Chinese Patent Application No. 201210397254.2.

* cited by examiner

ROBOT CLEANER AND METHOD FOR CONTROLLING THE SAME

CROSS-REFERENCE TO RELATED APPLICATIONS

This application is a continuation Application of U.S. application Ser. No. 13/652,853, filed on Oct. 16, 2012, which claims the benefit of Korean Patent Application Nos. 10-2011-0106698 and 10-2012-0022328, filed on Oct. 18, 2011 and Mar. 5, 2012, respectively, in the Korean Intellectual Property Office, the disclosures of which are incorporated herein by reference.

BACKGROUND

1. Field

Embodiments of the present disclosure relate to a robot cleaner including an auxiliary cleaning tool to perform an efficient cleaning operation and a method for controlling the same.

2. Description of the Related Art

A robot cleaner automatically cleans a region by sucking foreign matter such as dust from a floor of the cleaning region while autonomously traveling about the cleaning region without being operated by a user.

A robot cleaner senses an obstacle or wall disposed within a cleaning region, using various sensors, and controls a travel path and a cleaning operation, based on the sensing result.

The robot cleaner repeatedly performs a cleaning task while traveling on a floor in accordance with a predetermined travel pattern. When there is an obstacle or wall in a cleaning region, it may be difficult for a main brush to reach a portion of the floor contacting the obstacle or wall. As a result, cleaning may be ineffectively achieved.

To this end, the robot cleaner is equipped with auxiliary cleaning tools, which are outwardly protruded from the robot cleaner. Such auxiliary cleaning tools are mounted to opposite sides of a cleaner body and sweep dust or the like on the floor into the cleaner body while rotating.

However, a robot cleaner of the related art has a problem in that it cannot perform an efficient cleaning operation since the operation of auxiliary cleaning tools is not controlled in accordance with the travel pattern of the robot cleaner.

SUMMARY

Therefore, it is an aspect of the present disclosure to provide a robot cleaner and a method for controlling the same, capable of controlling a travelling or cleaning pattern of a robot cleaner in accordance with extension and retraction operations of an auxiliary cleaning tool to perform an efficient cleaning operation.

Additional aspects will be set forth in part in the description which follows and, in part, will be obvious from the description, or may be learned by practice of the invention.

In accordance with one aspect, provided is a robot cleaner for removing foreign matter from a floor while traveling on the floor, including: a plurality of auxiliary cleaning units mounted to a bottom of the robot cleaner such that the auxiliary cleaning units are extendable and retractable; an obstacle sensor to sense an obstacle in a cleaning region of the robot cleaner; and a control unit to extend the auxiliary cleaning units while travelling in a wall tracing manner along the periphery of the cleaning region, and to retract the auxiliary cleaning units while the robot cleaner travels in an inner portion of the cleaning region when traveling of the periphery of the cleaning region is finished.

The control unit may extend only the auxiliary cleaning unit present on the wall surface among the auxiliary cleaning units.

The control unit may control a speed of the robot cleaner that travels in a wall tracing manner lower than a speed of the robot cleaner that travels in an inner portion of the cleaning region.

The sensing unit may include: an obstacle sensor that senses obstacles disposed in the cleaning region and is implemented by one or more of an ultrasonic sensor, a proximity sensor and an optical sensor; and a dust sensing unit that senses dust present on the floor of the cleaning region and is implemented by an optical sensor.

The control unit may increase a cleaning speed of the auxiliary cleaning units, when the obstacle sensor senses a wall disposed in front thereof while the robot cleaner travels in a wall tracing manner.

The control unit may repeat extension and retraction of the auxiliary cleaning units at predetermined intervals when an amount of dust sensed by the dust sensing unit is a predetermined reference value or more.

In accordance with another aspect, provided is a robot cleaner for removing foreign matter from a floor while traveling on the floor, including: a plurality of auxiliary cleaning units mounted to a bottom of the robot cleaner such that the auxiliary cleaning units are extendable and retractable; an obstacle sensor to sense obstacles or dust in a cleaning region of the robot cleaner; and a control unit to set a first cleaning mode or a second cleaning mode based on the user command or the sensing results of the sensing unit, and control an operation of the robot cleaner in accordance with the set cleaning mode, wherein the first cleaning mode is a cleaning mode that cleans even a portion in which the obstacle contacts the floor by extending the auxiliary cleaning units when the sensing unit senses obstacles, and the second cleaning mode is a cleaning mode that rapidly cleans by retracting the auxiliary cleaning units when the sensing unit senses the obstacles.

The sensing unit may include: an obstacle sensor that senses obstacles disposed in the cleaning region and is implemented by one or more of an ultrasonic sensor, a proximity sensor and an optical sensor; and a dust sensing unit that senses dust present on the floor of the cleaning region and is implemented by an optical sensor.

The second cleaning mode may extend the auxiliary cleaning units when the sensing unit does not sense the obstacles.

The robot cleaner may further include: an input unit to receive a selection command of the cleaning mode from a user, wherein the control unit controls an operation of the robot cleaner in accordance with the cleaning mode selected via the input unit.

The control unit may control the robot cleaner to perform test travel in order to calculate the number of obstacles present in the cleaning region when a cleaning start command is input, and the sensing unit may sense obstacles present in the cleaning region during test travel and may transmit the sensing results to the control unit.

The control unit may calculate the number of obstacles present in the cleaning region based on the sensing results of the sensing unit and may control operations of the robot cleaner in accordance with the second cleaning mode, when the calculated number of obstacles is a predetermined reference value or more and may control operations of the robot cleaner in accordance with the first cleaning mode, when the calculated number of obstacles is lower than the predetermined reference value.

The control unit may repeat extension and retraction of the auxiliary cleaning units at predetermined intervals when an amount of dust sensed by the dust sensing unit is a predetermined reference value or more.

In accordance with another aspect, provided is a method for controlling a robot cleaner including extendably and retractably mounted auxiliary cleaning units, including: determining whether the robot cleaner travels in a wall tracing manner when a cleaning start command is input; outwardly extending the robot cleaner when the robot cleaner travels in a wall tracing manner; determining whether the wall tracing travel of the robot cleaner is finished; and retracting the auxiliary cleaning units when travel of the wall tracing manner is finished.

The control unit may extend only the auxiliary cleaning units present on the wall surface among the auxiliary cleaning units, when the robot cleaner travels in a wall tracing manner.

The control unit may control a speed of the robot cleaner that travels in a wall tracing manner lower than a speed of the robot cleaner that travels in an inner portion of the cleaning region.

The method may further include: sensing obstacles disposed in front of the robot cleaner, wherein a cleaning speed of the auxiliary cleaning units is increased, when a wall disposed in front of the robot cleaner is sensed while the robot cleaner travels in a wall tracing manner.

The method may further include: sensing dust disposed in the cleaning region; and repeating extension and retraction of the auxiliary cleaning units at predetermined intervals when an amount of dust sensed by the dust sensing unit is a predetermined reference value or more.

In accordance with another aspect, provided is a method for controlling a robot cleaner including extendably and retractably mounted auxiliary cleaning units, including: setting a first cleaning mode or a second cleaning mode based on a user command or the sensing results of the obstacle; extending the auxiliary cleaning units when obstacles are sensed in a cleaning region to be cleaned by the robot cleaner, and retracting the auxiliary cleaning units when obstacles are not sensed in a cleaning region to be cleaned by the robot cleaner in a case in which the first cleaning mode is set; and retracting the auxiliary cleaning units when obstacles are sensed in a cleaning region to be cleaned by the robot cleaner and extending the auxiliary cleaning units when obstacles are not sensed in a cleaning region to be cleaned by the robot cleaner in a case in which the second cleaning mode is set.

The method may further include: sensing obstacles present in the cleaning region of the robot cleaner; and calculating the number of obstacles based on the sensing results, wherein operations of the robot cleaner are controlled in accordance with the second cleaning mode, when the calculated number of obstacles is a predetermined reference value or more.

Extension and retraction of the robot cleaner may be repeated at predetermined intervals, when dust present in the cleaning region of the robot cleaner is sensed and an amount of the sensed dust is a predetermined reference value or more.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
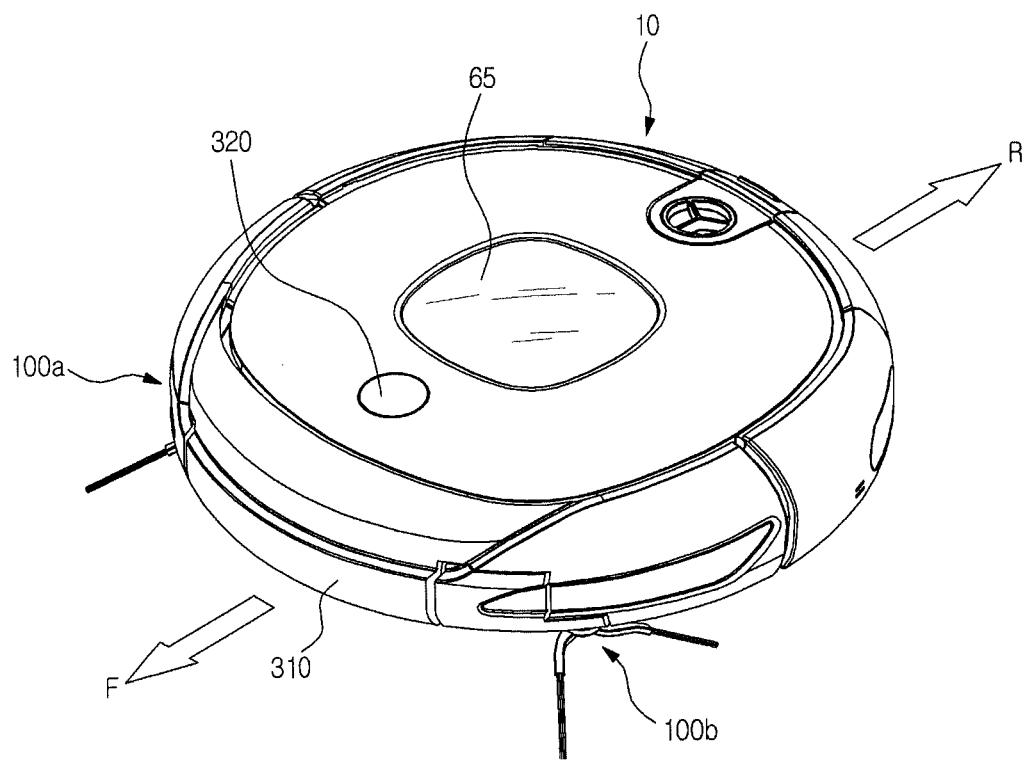
FIG. 1 shows a perspective view of a robot cleaner according to one embodiment.

Reference will now be made in detail to the embodiments, examples of which are illustrated in the accompanying drawings, wherein like reference numerals refer to the like elements throughout. The embodiments are described below to explain the present disclosure by referring to the figures.

Hereinafter, embodiments of the present disclosure will be described with reference to the accompanying drawings.

Figure 2:
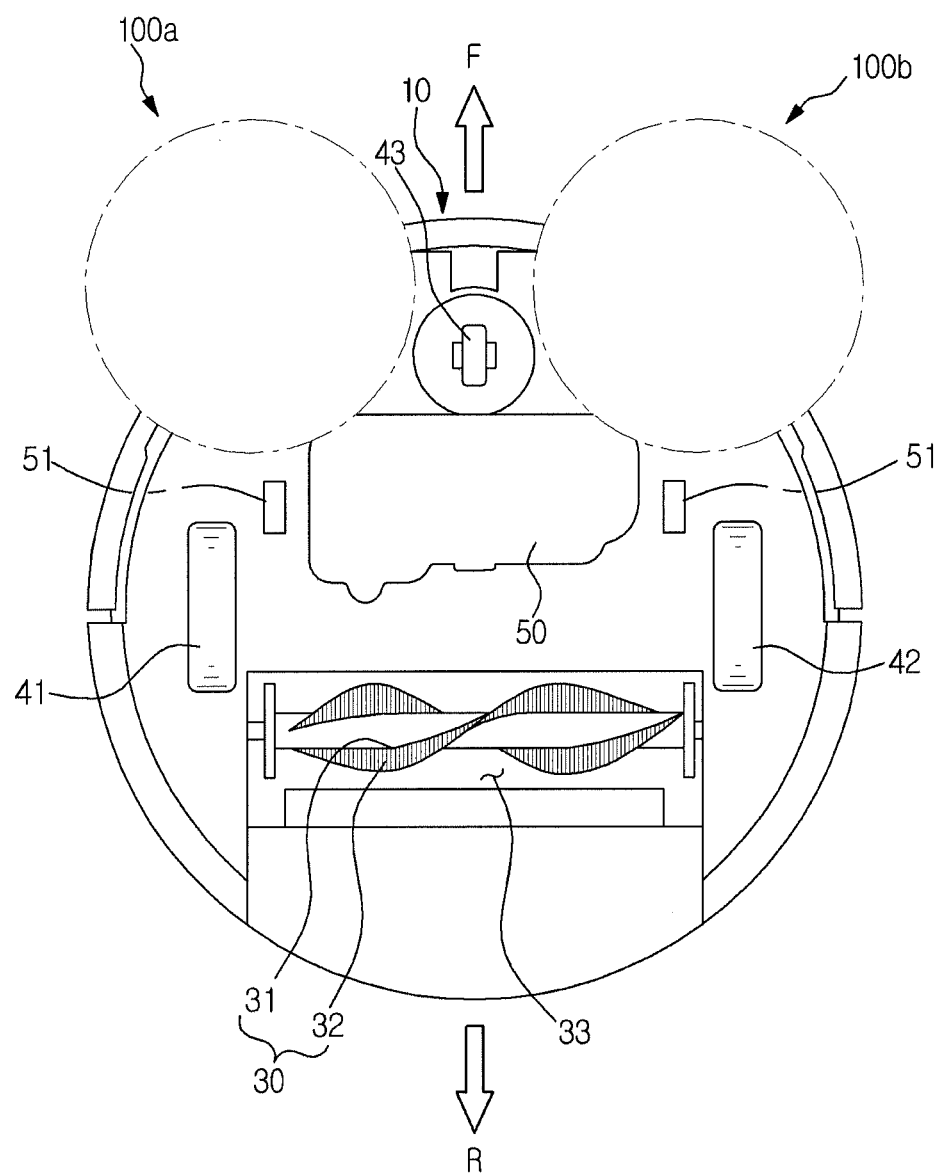
FIG. 2 shows a bottom view of the robot cleaner according to the illustrated embodiment.

Referring to FIGS. 1 and 2, the robot cleaner, which is designated by reference numeral 1, includes a body 10 to define an outer appearance of the robot cleaner 1, a main brush unit 30 to sweep dust on a floor such that the swept dust is guided to a suction inlet, a power supply 50 to supply drive power to drive the body 10, drive wheels 41 and 42 and a caster 43 to drive the body 10, and auxiliary cleaning units 100a and 100b to clean areas of the floor disposed adjacent to a wall and edge areas of the floor.

The drive wheels 41 and 42, are centrally arranged at opposite sides of a bottom of the body 10 in a symmetrical manner, respectively. The drive wheels 41 and 42 may perform movement operations including forward movement, backward movement, and rotation during execution of cleaning.

The caster 43 is installed at a front edge portion of the bottom of the body 10 when viewed on the basis of a travel direction. The caster 43 varies a rotation angle thereof in accordance with the state of the floor, on which the robot cleaner 1 travels, to allow the body 10 to keep a stable posture. The drive wheels 41 and 42, and caster 43 may be configured into a single assembly detachably mounted to the body 10.

The power supply 50 includes a battery electrically connected to the body 10 and drivers to drive various elements mounted to the body 10, to supply drive power to the body 10 and drivers. The battery is constituted by a rechargeable secondary battery. When the body 10 is coupled to a docking station (not shown) after completing a cleaning operation, the battery receives electric power from the docking station, to be charged.

The main brush unit 30 is mounted at an opening formed at a portion of the bottom of the body 10 biased from a central region of the body 10 in a rear direction R.

The main brush unit 30 removes foreign matter such as dust accumulated on the floor, on which the body 10 is disposed. The opening of the bottom of the body 10, at which the main brush unit 30 is mounted, functions as a dust inlet 33.

The main brush unit 30 includes a roller 31, and a main brush 32 stuck in an outer surface of the roller 31. As the roller 31 rotates, the main brush 32 sweeps dust accumulated on the floor such that the swept dust is guided to the dust inlet 33. The roller 31 may be made of steel, but embodiments of the present invention are not limited thereto. The main brush 32 may be made of various materials having elasticity.

Although not shown, a fan unit to generate suction force is provided within the dust inlet 33. The fan unit functions to move dust introduced into the dust inlet 33 to a dust collector 55.

A sensing unit 60 is mounted to the body 10, to sense the surroundings of the robot cleaner 1. The sensing unit 60 may include a proximity sensor 61 and/or a vision sensor 62. For example, when the robot cleaner 1 travels in a random direction under the condition that there is no predetermined path, along which the robot cleaner 1 travels, that is, in a cleaning system having no map, the robot cleaner 1 may travel about a cleaning region, using the proximity sensor 61. On the other hand, when the robot cleaner 1 travels along a predetermined path, that is, in a cleaning system requiring a map, the vision sensor 62 may be installed to receive position information of the robot cleaner 1, and thus to create a map. The sensing unit 60 may be implemented in various manners.

A display unit 65 is provided to display various states of the robot cleaner 1. For example, the display unit 65 may display a charged state of the battery, whether or not the dust collector 55 is full of dust, a mode of the robot cleaner, for example, a cleaning mode or a dormant mode, etc.

Although not shown, the robot cleaner may include an input unit to receive commands associated with various modes such as a travel mode and a cleaning mode, power on/off commands, etc. in accordance with an embodiment of the present invention.

Hereinafter, the configuration and structure of auxiliary cleaning unit 100a or 100b included in the robot cleaner according to the illustrated embodiment will be described with reference to FIGS. 3 to 6.

Each auxiliary cleaning unit 100a or 100b is mounted to the bottom of the robot cleaner such that it is extendable and retractable. The structure, which enables the auxiliary cleaning unit to be extendable and retractable, may be implemented through various embodiments. In the following description, two embodiments will be described.

Figure 3:
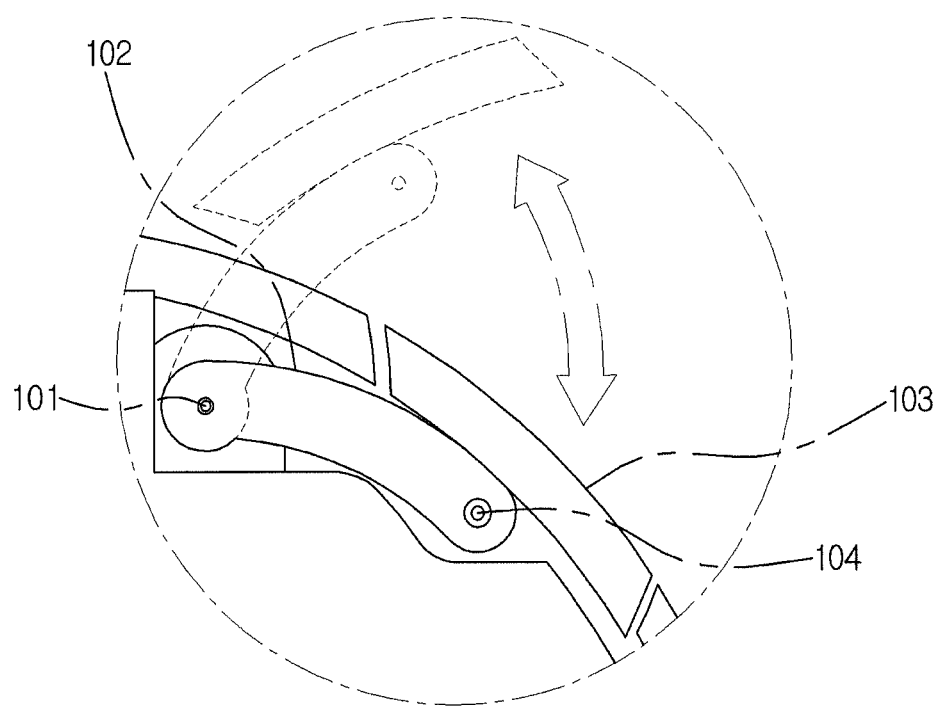
FIG. 3 is a view schematically illustrating one embodiment associated with the structure of enabling each auxiliary cleaning unit to be extendable and retractable.

FIG. 3 is a view schematically illustrating one embodiment associated with the structure of enabling each auxiliary cleaning unit to be extendable and retractable. The auxiliary cleaning unit 100 will be represented without distinguishing the left auxiliary cleaning unit 100b from the right auxiliary cleaning unit 100a below, since the left and right auxiliary cleaning units may have an identical basic structure.

Referring to FIG. 3, each auxiliary cleaning unit 100a or 100b includes a side arm 102 and a periphery cover 103.

The side arm 102 is coupled to a front portion of the bottom of the body 10 at one side of the body 10. An arm motor (not shown) is received in the body 10 over the side arm 102, to drive the side arm 102. The arm motor is connected to a rotation shaft (not shown) via gears to transmit drive force to the side arm 102. The rotation shaft is mounted to a coupling groove 101 formed at one end of the side arm 102.

When the arm motor drives, the rotation shaft is rotated, thereby causing the side arm 102 to pivot about the coupling groove 101. In this case, the side arm 102 pivots outwardly of the body 10. In this state, the periphery cover 103 no longer covers the opening of the body 10. That is, the periphery cover 102 no longer forms the periphery of the body 10.

A coupling groove 104, to which an auxiliary cleaning tool is coupled, is formed at the other end of the side arm 102. A rotation motor (not shown) is received in the body over the coupling groove 104, to drive the auxiliary cleaning tool. The auxiliary cleaning tool is rotated about the coupling groove 104 by drive force of the rotation motor.

Figure 4:
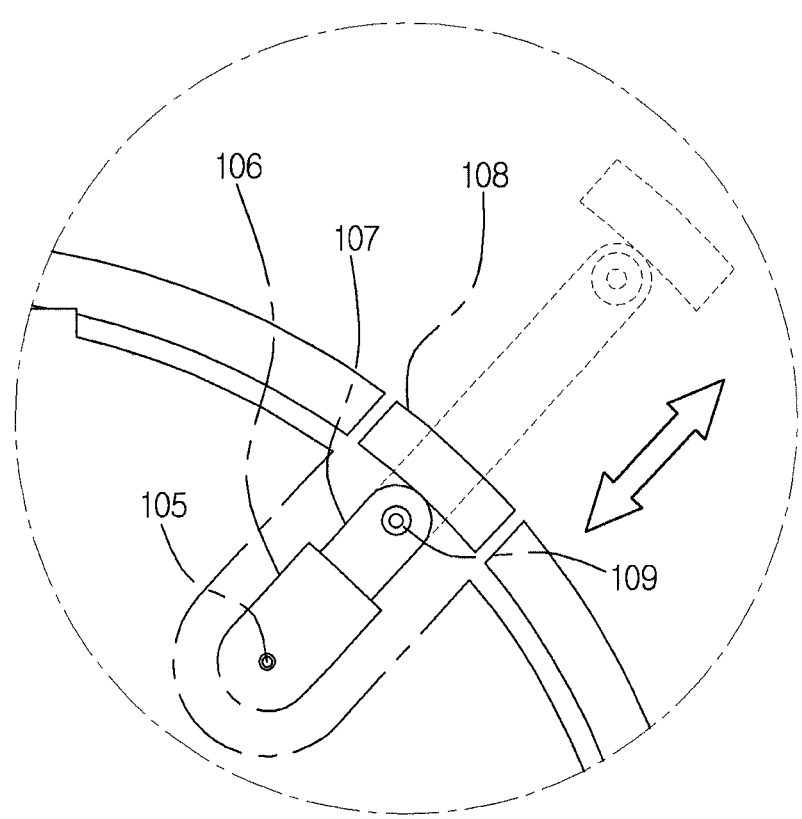
FIG. 4 is a view schematically illustrating the other embodiment associated with the structure of enabling each auxiliary cleaning unit to be extendable and retractable.

FIG. 4 is a view schematically illustrating the an embodiment associated with the structure of enabling each auxiliary cleaning unit to be extendable and retractable.

Referring to FIG. 4, each auxiliary cleaning unit 100a or 100b includes a side arm 106 and a periphery cover 108.

The side arm 106 is coupled to a front portion of the bottom of the body 10 at one side of the body 10 via a coupling groove 105. An extension arm 107 is received in the side arm 106 such that it is extendable outwardly of the side arm 106 in a sliding manner.

The extension arm 107 moves forward and rearward within the side arm 106 in a longitudinal direction of the side arm 106. To this end, a rail is formed within the side arm 106, and a guide (not shown), which is engaged with the rail, is formed at the extension arm 107. Accordingly, the extension arm 107 may slidably move along the rail in a state of being coupled to the rail. Another extension arm may be received in the extension arm 107 such that it is extendable outwardly of the extension arm 107 in a sliding manner. Meanwhile, the movement of the another extension arm may be carried out in the same manner as described above. There is no limitation as to the number of extension arms.

An arm motor (not shown) is received in the body 10 over the side arm 106, to drive the side arm 106. The arm motor transmits drive force to the extension arm 107 via gears. When the arm motor drives, the extension arm 107 slides outwardly of the side arm 106, to extend outwardly of the body 10. In this state, the periphery cover 108 no longer covers the opening of the body 10. That is, the periphery cover 108 no longer forms the periphery of the body 10.

A coupling groove 109, to which an auxiliary cleaning tool is coupled, is formed at one end of the extension arm 107. A rotation motor (not shown) is received in the body over the coupling groove 109, to drive the auxiliary cleaning tool. The auxiliary cleaning tool is rotated about the coupling groove 109 by drive force of the rotation motor.

The auxiliary cleaning tool, which is also included in the auxiliary cleaning unit, carries out cleaning. The auxiliary cleaning tool may include a brush to sweep or disperse foreign matter such as dust, a floorcloth to wipe the floor, or a suction device to suck foreign matter such as dust. Of course, these examples are illustrative and, as such, there is no limitation as to the kind of the auxiliary cleaning tool applied to the embodiments as long as the auxiliary cleaning tool carries out auxiliary cleaning.

Figure 5:
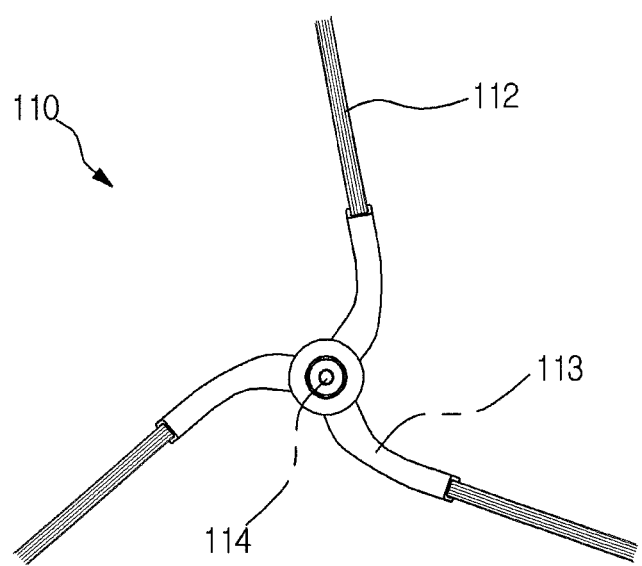
FIG. 5 is a view schematically illustrating a configuration of the auxiliary cleaning tool according to one embodiment.

FIG. 5 is a view schematically illustrating a configuration of the auxiliary cleaning tool according to an exemplary embodiment.

Referring to FIG. 5, the auxiliary cleaning tool, which is designated by reference numeral 110, includes brush arms 113 coupled to form a central common end such that they outwardly extend in a radial direction from the central common end while being spaced apart from one another in a circumferential direction. An auxiliary brush 112 is coupled to each brush arm 113. A rotation shaft 114 is formed at the central common end of the brush arms 113. The rotation shaft 114 extends to be coupled to the side arm 102 or extension arm 106 via the coupling groove 109. When the auxiliary cleaning tool 110 rotates, the auxiliary brush 112 sweeps dust accumulated on an area disposed adjacent to a wall toward the central region of the body 10 or disperses the dust.

Figure 6:
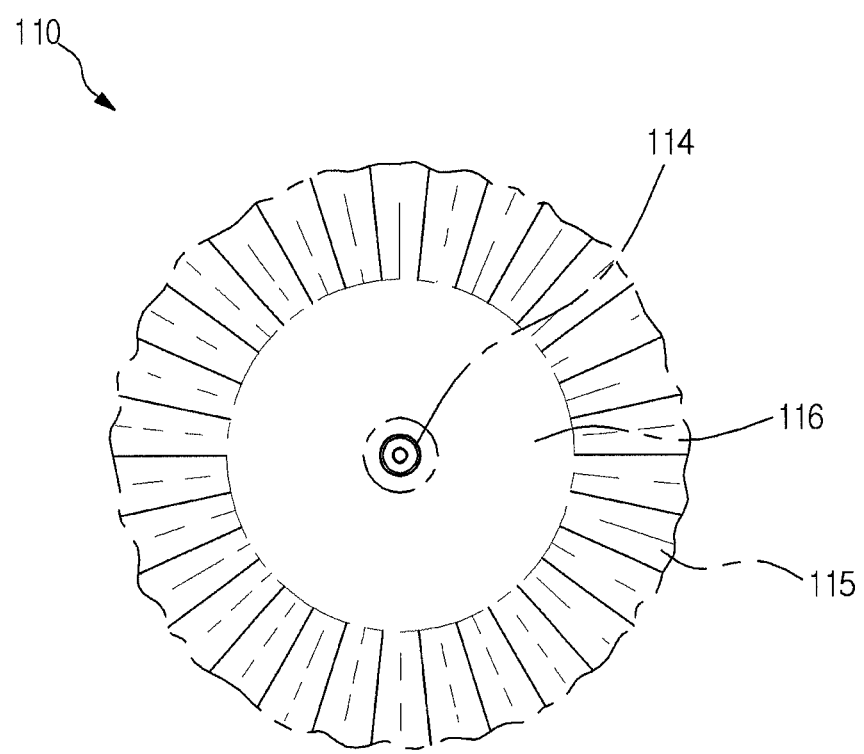
FIG. 6 is a view schematically illustrating a configuration of the auxiliary cleaning tool according to another embodiment.

FIG. 6 is a view schematically illustrating a configuration of the auxiliary cleaning tool according to an embodiment.

Referring to FIG. 6, the auxiliary cleaning tool 110 includes a circular floorcloth holder 116. An auxiliary floorcloth 115 is fitted around the floorcloth holder 116 in a radial direction. A rotation shaft 114 is formed at a center of the floorcloth holder 116 such that it axially extends. The rotation shaft 114 receives drive force from a rotation motor, to rotate the auxiliary cleaning tool 110. The rotation shaft 114 is coupled to the side arm 102 or extension arm 106 via the coupling groove. When the auxiliary cleaning tool 110 rotates, the auxiliary floorcloth 115 scrubs an area disposed adjacent to a wall.

When the embodiment of FIG. 6 is applied together with the embodiment of FIG. 4, the cleaning operation of the auxiliary cleaning unit 100 may include not only rotation of the auxiliary cleaning tool 110, but also repeated extension and retraction of the extension arm 106. Otherwise, the cleaning operation may be carried out only through repeated extension and retraction of the extension arm 106 without rotation of the auxiliary cleaning tool 110.

Meanwhile, the auxiliary brush 112 may be made of various materials having elasticity. The auxiliary floorcloth 115 may be made of a fiber material or various materials other than the fiber material.

The robot cleaner 1 according to the illustrated embodiment may clean even an area of the floor disposed adjacent to a wall or an edge area of the floor, because the effective cleaning region of the robot cleaner 1 is extended by virtue of the auxiliary cleaning units 100a and 100b outwardly extendable from the body 10.

Although two auxiliary cleaning units 100 are provided at opposite sides of the robot cleaner 1, respectively, in the embodiments of FIGS. 1 to 6, embodiments are not limited thereto. There is no limitation as to the number of auxiliary cleaning units 100 and the mounting positions of auxiliary cleaning units 100. Of course, for convenience of description, the following embodiments will be described in conjunction with the case in which two auxiliary cleaning units 100 are provided at opposite sides of the robot cleaner 1, respectively, as in the embodiments of FIGS. 1 to 6. Also, for convenience of description, the following description will be given only in conjunction with one auxiliary cleaning unit 100 because the two auxiliary cleaning units 100 have the same configuration.

Hereinafter, travel and cleaning operations of the robot cleaner 1 according to the illustrated embodiment carried out on the basis of the above-described configuration will be described in detail.

In the following embodiments, it is assumed that cleaning by the main brush unit is basically carried out during travel of the robot cleaner.

Although the auxiliary cleaning tool 110, which is applicable to embodiments, may be implemented in various forms such as a brush and a floorcloth, as described above, the following embodiments will be described in conjunction with the case in which the auxiliary cleaning tool 110 is implemented in the form of a brush, for convenience of description.

Figure 7:
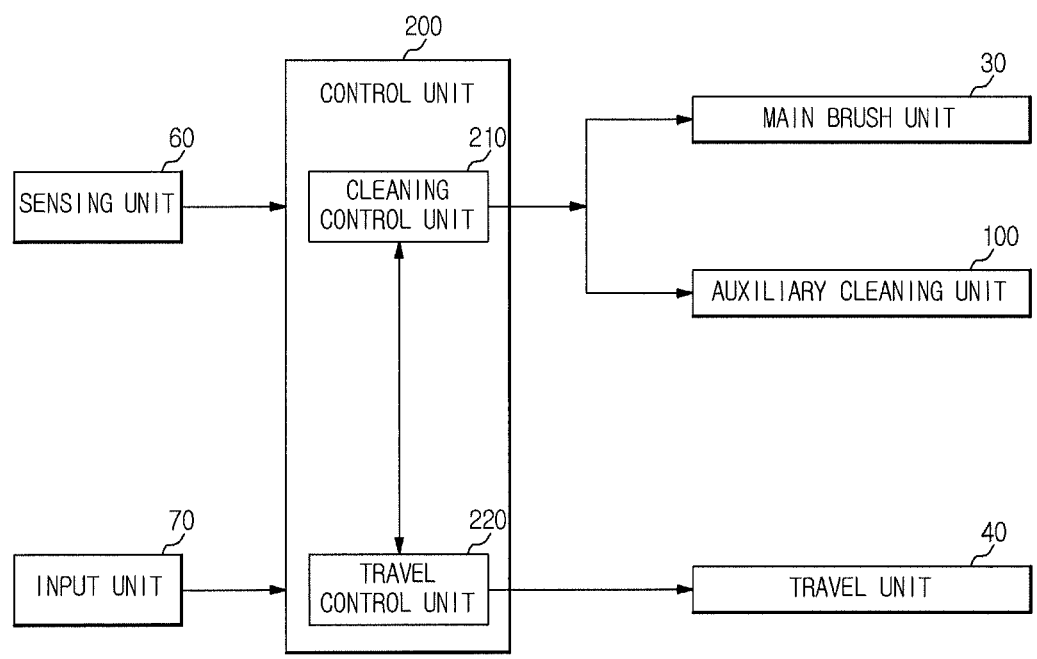
FIG. 7 shows a block diagram of a control configuration of the robot cleaner according to one embodiment.

FIG. 7 shows a block diagram of a control configuration of the robot cleaner according to an exemplary embodiment of the present invention.

Referring to FIG. 7, in accordance with the illustrated embodiment of the present invention, the robot cleaner 1 includes a sensing unit 60 to sense the state of the auxiliary cleaning unit 100 and the surroundings of the robot cleaner 1, an input unit 70 to receive a command from the user in association with travel or cleaning operation of the robot cleaner 1, and a control unit 200 to control the travel and cleaning operation of the robot cleaner 1 in accordance with the sensing result of the sensing unit 60 or the command input to the input unit 70. The main brush unit 30 and auxiliary cleaning unit 100 to perform the cleaning operation of the robot cleaner 1 are also included in the robot cleaner 1. The robot cleaner 1 further includes a travel unit 40 to perform the travel of the robot cleaner 1.

The sensing unit 60 senses obstacles adjacent thereto while the robot cleaner 1 moves. The sensing unit 60 may be realized by an ultrasonic sensor, an optical sensor or a proximity sensor. The sensing unit 60 realized by an ultrasonic sensor transmits ultrasonic waves to a travel path and receives the reflected ultrasonic wave to sense obstacles. In the sensing unit 60 realized by an optical sensor, an infrared-emitting device emits an infrared ray and an infrared-receiving device receives the reflected infrared ray to sense obstacles. Further, proximity sensors, contact sensors or the like may be used and the configuration thereof is not limited so long as it can sense obstacles.

The input unit 70 receives a command from the user in association with travel or cleaning operation of the robot cleaner 1. Basically, a cleaning start command or a cleaning finish command may be input through on/off input. Also, commands respectively associated with a travel mode and a cleaning mode may be input. The input unit 70 is provided at the body 10 of the robot cleaner 1. The input unit 70 may be implemented in the form of buttons. Alternatively, the input unit 70 may be implemented in the form of a touch panel provided at the display unit 65.

The control unit 200 controls the overall operation of the robot cleaner 1 and broadly includes a cleaning controller 210 to control the main brush unit 30 and a travel control unit 220 to control travel.

The cleaning controller 210 controls the main brush unit 30 and the auxiliary cleaning unit 100 according to the cleaning mode set based on the sensing results of the sensing unit 60 or user commands input via the input unit 70.

The travel control unit 220 controls the travel unit 40 according to the cleaning mode set based on the sensing results of the sensing unit 60 or user commands input via the input unit 70 and thereby controls a travel direction and a travel speed of the robot cleaner 1.

Detailed operations of the cleaning controller 210 and the travel control unit 220 will be described below.

As described above, the main brush unit 30 includes the roller 31, and the main brush 32 stuck in the outer surface of the roller 31. As the roller 31 rotates, the main brush 32 sweeps dust accumulated on the floor such that the swept dust is guided to the dust inlet 33. Thus, main cleaning operation is carried out. When the cleaning controller 210 sends a control signal to the drive motor to drive the roller 31, the main brush 32 performs cleaning operation in accordance with the control signal.

The auxiliary cleaning unit 100 performs cleaning of an edge area, for which it is difficult to achieve effective cleaning, using the main brush unit 30. The auxiliary cleaning unit 100 includes the side arm 102 or 106 and/or the extension arm 107, which extends or retracts the auxiliary cleaning tool 110, the rotation motor to rotate the auxiliary cleaning tool 110, and the arm motor to drive the side arm 102 or 106 and/or the extension arm 107.

As described above, the travel unit 40 includes the drive wheels 41 and 42, the caster 43, and the driver to drive the drive wheels 41 and 42. The travel control unit 230 sends a control signal to the driver, to drive the drive wheels 41 and 42 forward or rearward, and thus to move the robot cleaner 1 forward or rearward. Meanwhile, during rearward driving of the left drive wheel 41 or 42, it may be possible to turn the robot cleaner 1 to the left when viewed in front of the robot cleaner 1 by forwards driving the right driver wheel 42 or 41. Through driving of the drive wheels 41 and 42 in a reverse manner to the above-described case, it may be possible to turn the robot cleaner 1 to the right when viewed in front of the robot cleaner 1.

Hereinafter, the operation of the robot cleaner 1 according to an embodiment will be described.

Figure 8A:
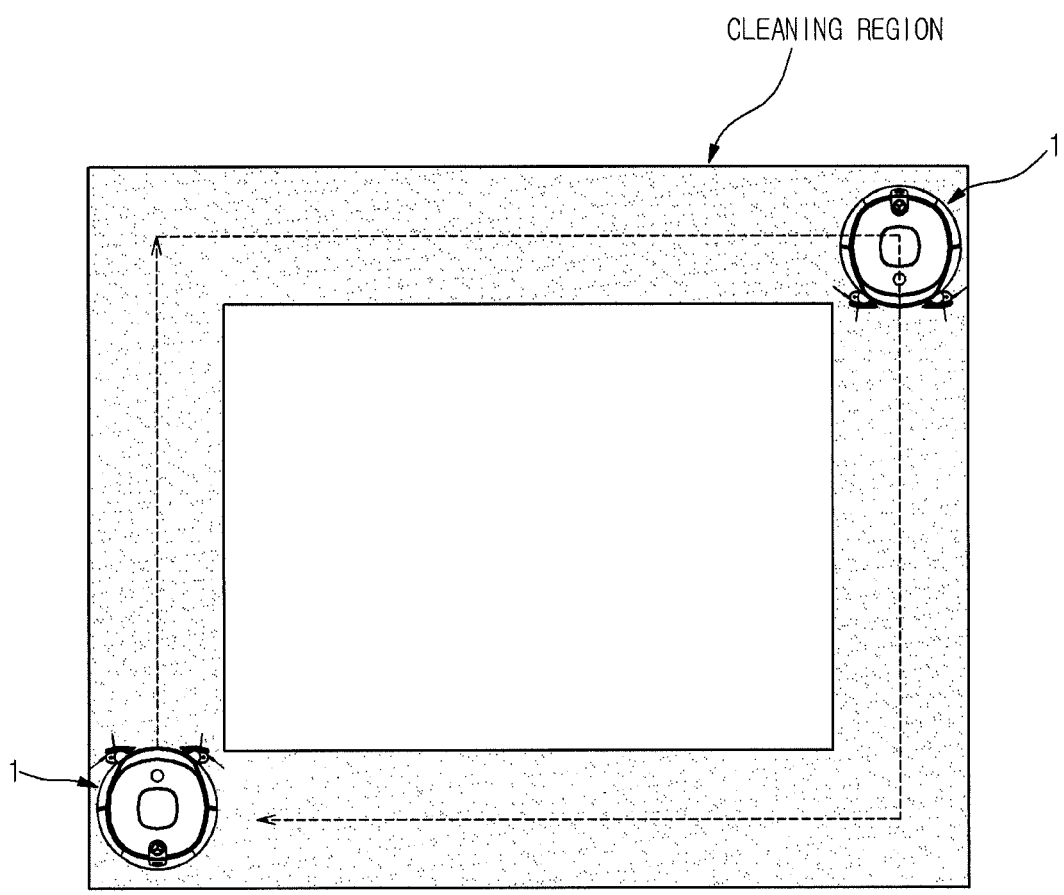
FIGS. 8A and 8B illustrate an overall configuration of travel and cleaning operations of the robot cleaner according to one embodiment when viewed from above.
Figure 8B:
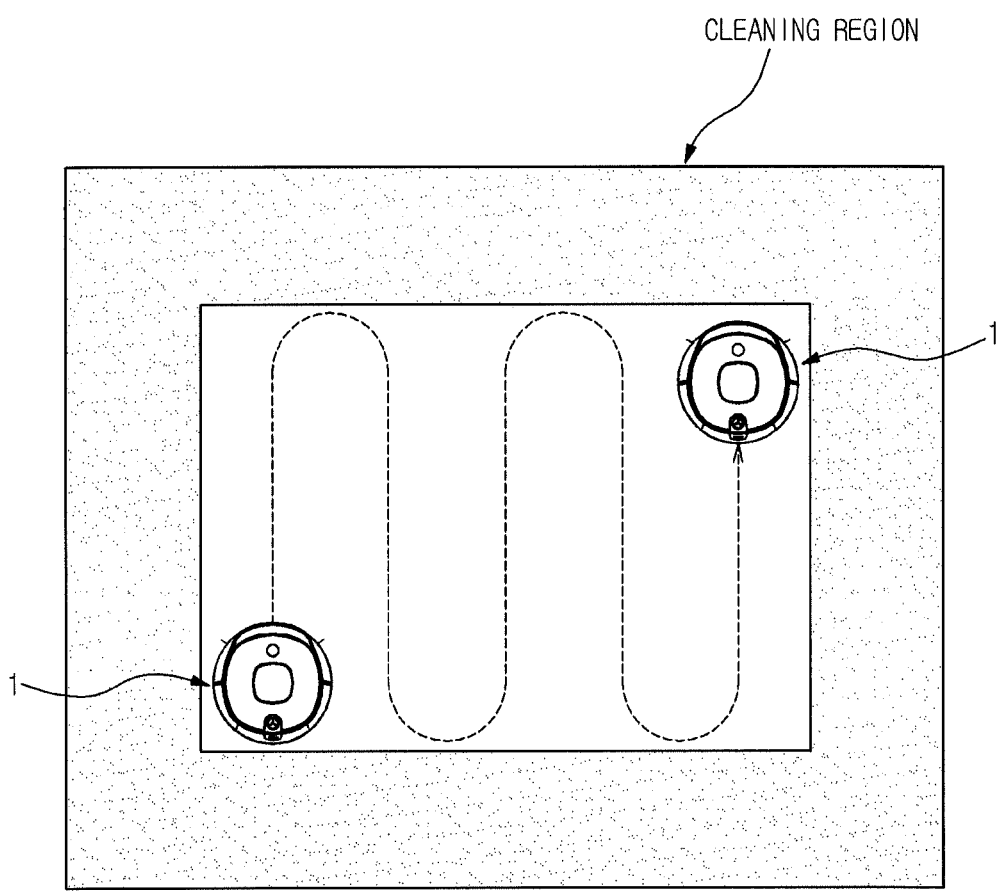

FIGS. 8A and 8B show an overall configuration of travel and cleaning operations of the robot cleaner 1 according to an embodiment when viewed from above.

When a user inputs a cleaning start command through the input unit 70, the robot cleaner 1 starts travel and cleaning operations. At this time, the travel mode of the travel control unit 220 may be set to wall tracing travel along the periphery of the cleaning region and then a random or predetermined travel inside the cleaning region.

Referring to FIG. 8A, when the robot cleaner 1 according to one embodiment of the present invention travels about the periphery of the cleaning region in a wall tracing manner, cleaning is not completely performed, since it is difficult for the brush 32 of the main brush unit 30 to reach an area of the floor disposed adjacent to a wall or an edge area of the floor. Also, the area of the floor disposed adjacent to a wall is a region in which dust is readily deposited, thus requiring accurate cleaning. Accordingly, when the robot cleaner 1 travels in a wall tracing manner, the auxiliary cleaning unit 100 is extended outwardly to clean the area of the floor disposed adjacent to a wall.

Referring to FIG. 8B, after the robot cleaner 1 according to one embodiment of the present invention finishes wall tracing travel in the periphery of the cleaning region, it starts travel in the cleaning region. In this case, the travel manner may be a zigzag travel mode, as shown in FIG. 8B, or other patterned travel or random travel.

Also, the inner part of the cleaning region may be an area, excluding a region which cleaning is completed by wall tracing travel, as shown in FIG. 8A, or an area including the region in which cleaning is completed by wall tracing travel. Through the former, it may be possible to realize complete cleaning within a short time, while, through the latter, it may be possible to realize accurate cleaning.

When the robot cleaner 1 travels about the inner part of the cleaning region, the extended auxiliary cleaning tools 110 is retracted. The inner part of the cleaning region has no edge that does not come in contact with the main brush 32. Accordingly, only using the main brush unit 30, it is possible to perform sufficient cleaning without using the auxiliary cleaning unit 100. If the robot cleaner 1 encounters an obstacle in the inner part of the cleaning region, the auxiliary cleaning tools 110 may be extended to clean around the edge of the obstacle.

Also, the auxiliary cleaning tools 110 may be rotated in a state that the auxiliary cleaning unit 100 is retracted. In this case, when a portion that does not contact the main brush unit 30 is present in a region in which the robot cleaner 1 travels, cleaning can be performed in the portion.

The travel path or pattern shown in FIGS. 8A and 8B is provided only for one embodiment. Regardless of the overall travel path or travel pattern of the robot cleaner 1, the wall tracing travel pattern extends the auxiliary cleaning unit 100 and other travel manner such as zigzag travel or random travel retracts the auxiliary cleaning tool 110.

Figure 9:
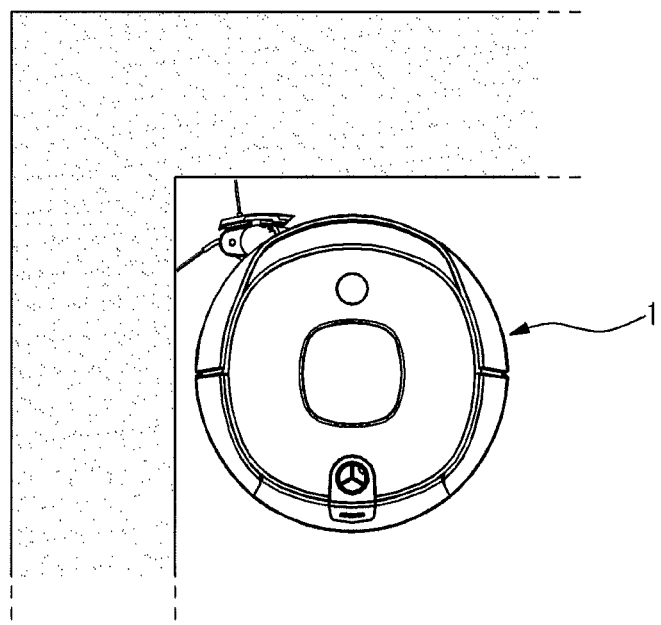
FIG. 9 is a view illustrating a robot cleaner disposed at the intersection between two walls.

Referring to FIG. 9, cleaning is not completely performed by the main brush 32 and dust is readily deposited at the intersection between two walls due to the structure of the robot cleaner 1.

Accordingly, when the robot cleaner 1 is deposited at the intersection between two walls while travelling in a wall tracing manner, efficient cleaning may be performed within a predetermined time by increasing the rotation speed of the auxiliary cleaning tools 110. For reference, when the auxiliary cleaning unit 100 is realized by combination of the embodiments of FIGS. 4 and 6, efficient cleaning can be performed by increasing a cleaning speed of the auxiliary cleaning tools 110. Here, the term "cleaning speed" may be determined by considering an extension and retraction repetition speed of the extension arm 107 or a rotation speed of the auxiliary cleaning tools 110 and the extension and retraction repetition speed of the extension arm 107.

For this purpose, the sensing unit 60 transfers the obstacle sensing results to the control unit 200 and the cleaning controller 210 analyzes the sensing results and, as a result, when an obstacle is disposed in front of the robot cleaner 1 that travels in a wall tracing manner, a control signal to increase the rotation speed of the auxiliary cleaning tools 110 is transmitted to the auxiliary cleaning unit 100.

When a sensor that can sense only an obstacle adjacent to the robot cleaner 1 is used as the sensing unit 60, the rotation speed of the auxiliary cleaning tools 110 may be increased only according to the sensing results of the obstacle presence. However, in a case in which a sensor that can sense an obstacle disposed by a long distance is used, when a distance that is sufficiently short to an extent that the robot cleaner 1 is considered to be disposed at the intersection between two walls is set as a reference value and the distance between the obstacle and the robot cleaner 1 is the reference value or less based on the sensing results of the sensing unit 60, the rotation speed of the auxiliary cleaning tools 110 can be increased.

Figure 10:
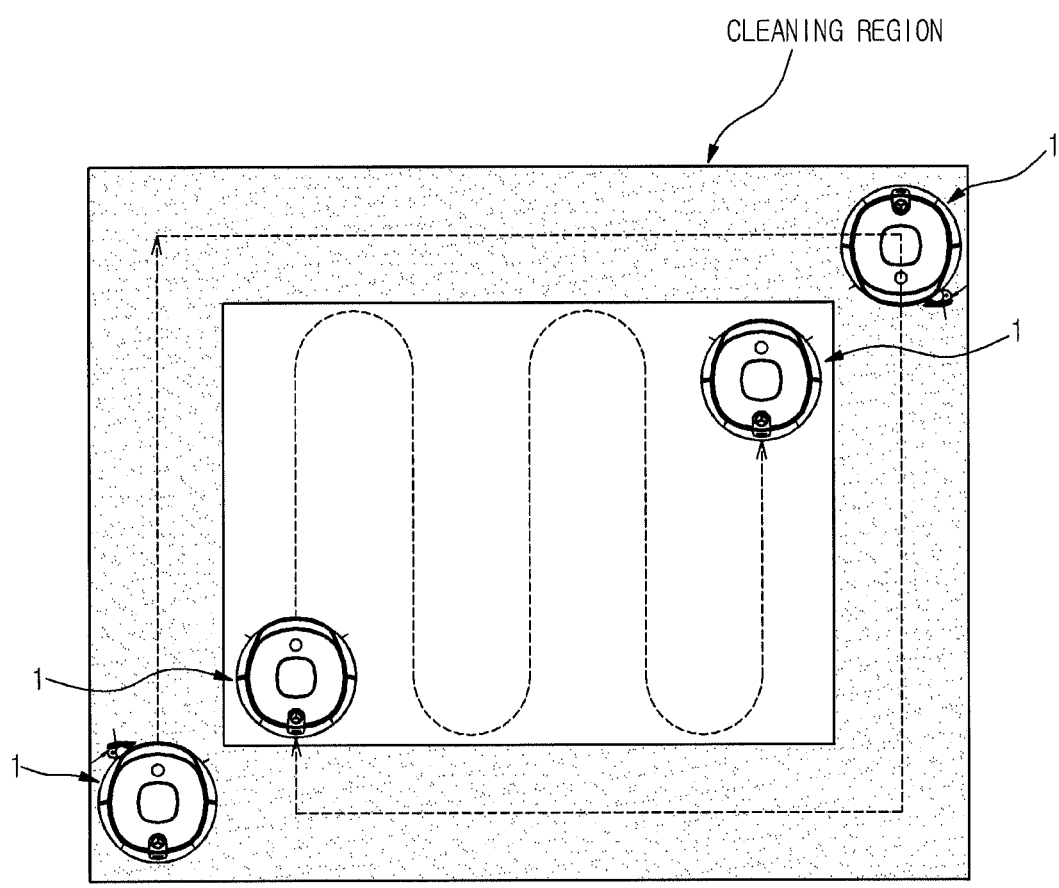
FIG. 10 is a view illustrating a case in which only the auxiliary cleaning tool disposed on the wall is extended in the robot cleaner illustrated in FIGS. 8A and 8B.

In the embodiment of FIG. 8A, both sides of the robot cleaner 1 is extended. As shown in FIG. 10, only the auxiliary cleaning tool present at the wall side is extended and the remaining auxiliary cleaning tool is not extended.

Travel of the robot cleaner 1 as mentioned above may be based on the predetermined path map or characteristic map, or a rotation or straight travel manner may be randomly determined through determination of presence of obstacles without using the map.

Hereinafter, travel based on the path map or characteristic map will be described in detail according to one embodiment.

Figure 11:
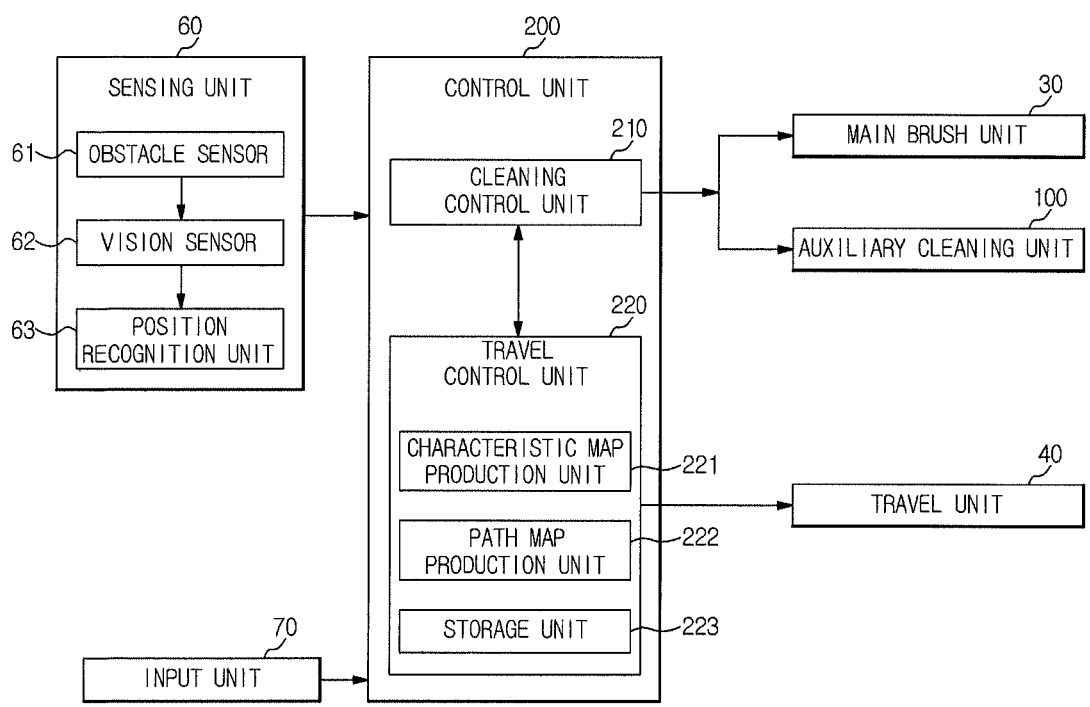
FIG. 11 is a block diagram illustrating a detailed control configuration of a travel control unit of the robot cleaner according to one embodiment.

FIG. 11 is a block diagram illustrating a detailed control configuration of a travel control unit 220 of the robot cleaner 1 according to one embodiment of the present invention.

As described in FIG. 7 above, the robot cleaner 1 according to an embodiment includes a sensing unit 60 to sense the surroundings of the robot cleaner 1, an input unit 70 to receive a command from the user, a control unit 200 to control the travel and cleaning operation of the robot cleaner 1, a main brush unit 30, an auxiliary cleaning unit 100 and a travel unit 40.

The sensing unit 60 includes an obstacle sensor 61 to sense obstacles such as ultrasonic sensor, optical sensor, or proximity sensor and further includes a vision sensor 62 to image a surrounding image suitable for extraction of characteristic points for production of a path map. The surrounding image may include ceiling, wall and floor and the ceiling having the lowest possibility of image variation is the most suitable for the surrounding image. Hereinafter, an example in which the ceiling is used for the surrounding image will be described.

The vision sensor 61 may be realized by a charge-coupled device (CCD), a complementary metal oxide semiconductor (CMOS) or other imaging device. The vision sensor 61 may include an analog-to-digital converter (ADC) that converts an analog signal of the obtained image into a digital signal.

Also, the sensing unit 60 further includes a position recognition unit 63 such as encoder, gyro sensor or acceleration sensor to recognize a present position of the robot cleaner 1.

The encoder is connected to driving wheels 41 and 42 to sense a rotation speed. By integrating the rotation speed sensed by the encoder, the position (or moved distance) and orientation angle of the robot cleaner 1 can be obtained. The gyro sensor measures an orientation angle of the robot cleaner 1 using rotational inertia. The acceleration sensor can measure the position of the robot cleaner 1 by double-integrating the movement acceleration speed of the robot cleaner 1.

The travel control unit 220 includes a characteristic map production unit 221 to extract a plurality of characteristic points from the ceiling image obtained from the vision sensor 62 and thereby produce a characteristic map, a path map production unit 222 to produce a path map of the robot cleaner 1 and a storage unit 223 to store the produced map.

The characteristic map production unit 221 extracts a plurality of characteristic points from the ceiling image obtained from the vision sensor 62 and thereby produces a characteristic map. The characteristic map includes characteristic points uniformly measured in the surroundings. The characteristic points mean points in which inherent characteristics are exhibited at a specific position.

Figure 12:
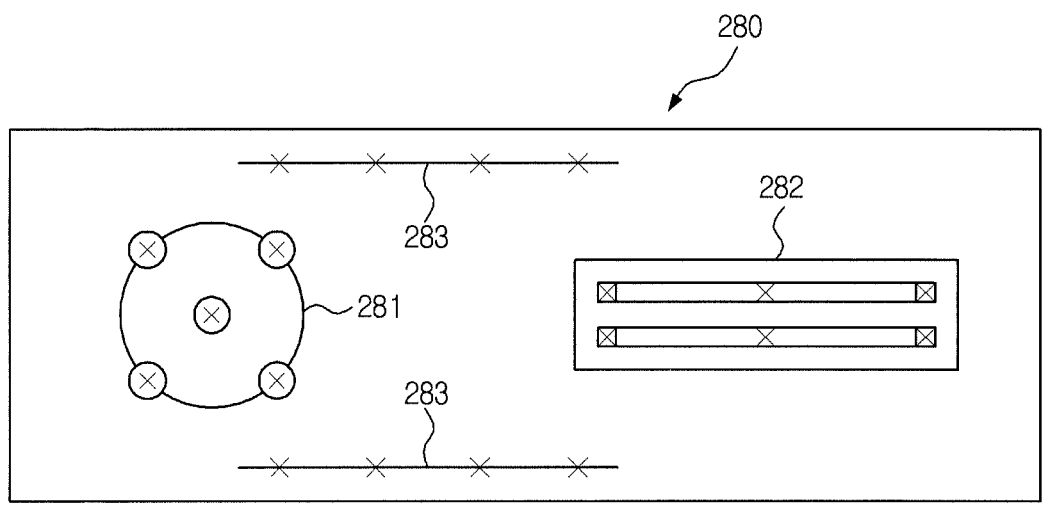
FIG. 12 is an image showing the robot cleaner according to one embodiment.

Referring to FIG. 12, the ceiling image 280 may include detailed images that distinguish different positions, such as a chandelier 281, a fluorescent light 282 or an edge portion 283. When characteristic points are represented in these detailed images, and the same characteristic points as the characteristic points represented in images obtained by the moving robot cleaner 1 are then found, the posture (position and orientation angle) of the robot cleaner 1 can be seen.

Figure 13:
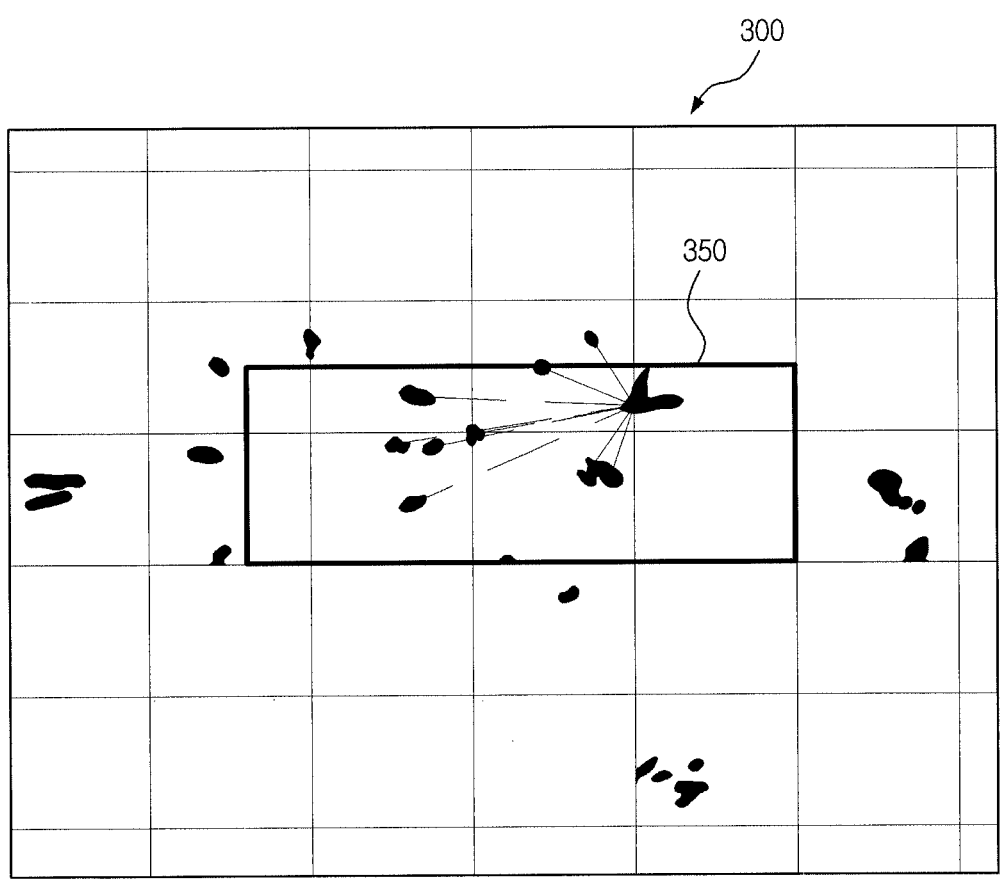
FIG. 13 is a sectional view illustrating an example of an actually made characteristic map.

FIG. 13 is a sectional view illustrating an example of an actually made characteristic map. The characteristic map 300 includes various shapes of characteristic points and adjacent characteristic points are connected to one another. When a combination of characteristic points previously defined in an image 350 photographed by the robot cleaner 1 is found, the position and orientation angle of the robot cleaner 1 can be seen. Meanwhile, as algorithm to extract the characteristic points described above, scale invariant feature transforms (SIFTs), descriptors, Harris corner detectors. Imaging as well as other SLAM methods such as radio frequency identification (RFID) and range finders using structure light are used to generate the characteristic map. Here, SLAM is an algorithm for simultaneously performing position recognition of the robot cleaner 1 and map production.

The characteristic map production unit 221 matches characteristic points obtained from the ceiling image with the positions measured by the position recognition unit 63 to complete a characteristic map. When the characteristic map production unit 221 finishes production of the characteristic map, it can easily recognize the position and orientation angle of the robot cleaner 1 by comparing characteristic points from the photographed image with the characteristic map.

The storage unit 223 stores the map produced in the characteristic map production unit 221. The storage unit 223 may be implemented by nonvolatile memory devices such as ROM, RAM, PROM, EPROM and flash memories, or volatile memory devices such as RAM, or storage media such as hard disks and optical disks or any other forms known in the related art.

Figure 14:
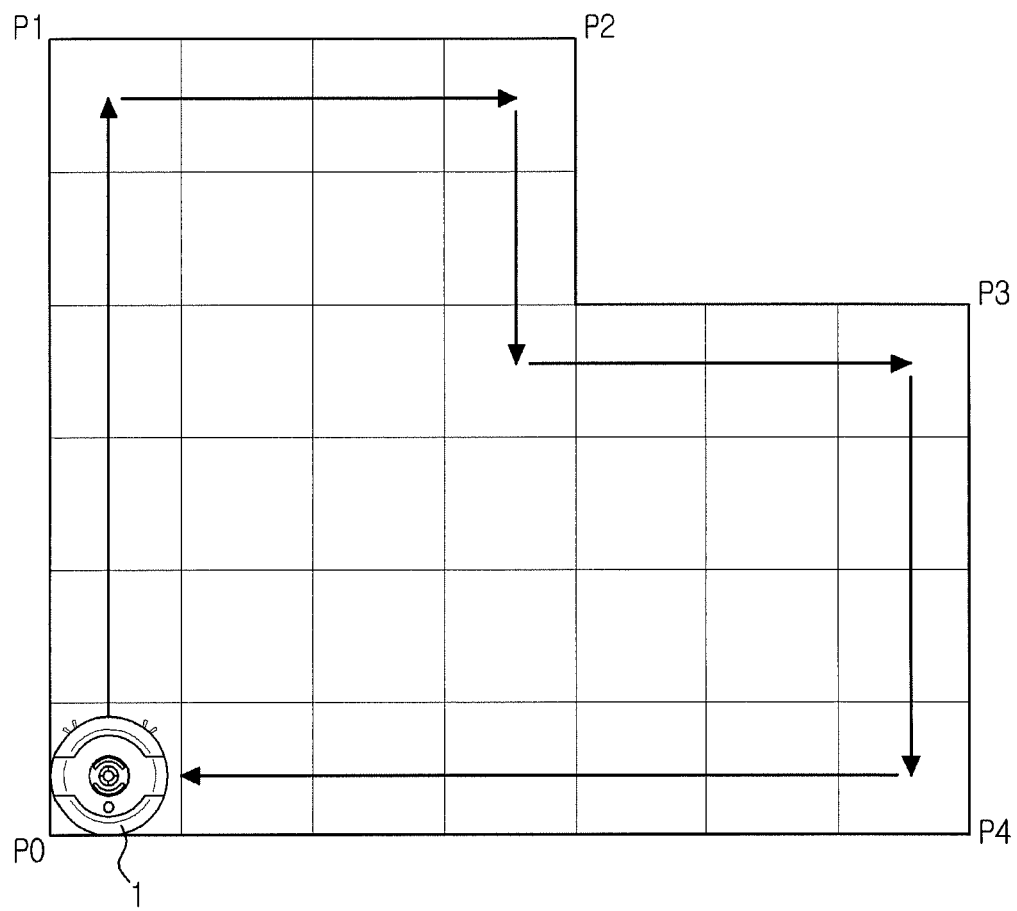
FIG. 14 illustrates an example of an actually made path map.

The path map production unit 222 produces a cleaning path map of the robot cleaner 1. Referring to FIG. 14, the path map production unit 222 stores position data of the periphery of the cleaning region and thereby produces a cleaning path map by moving the robot cleaner 1 along the wall. Specifically, the path map production unit 222 stores an initial position, "P0", stores data of edge position (P1 to P4) at which the movement direction is changed when the robot cleaner moves along the wall and sets P0 to P4 as the peripheral cleaning paths. The path map production unit 222 divides cleaning blocks based on the initial position (P0) and the edge positions (P1 to P4) and produces a cleaning path so that the robot cleaner travels and cleans the cleaning blocks in a specific pattern. Here, the specific pattern means a regulated pattern such as zigzag travel path, wall tracing path or spiral travel path and the cleaning path may be a combination of a plurality of specific patterns.

At this time, the operation of the auxiliary cleaning unit 100 of the robot cleaner 1 may be described in accordance with the cleaning path set in the path map production unit 222. Referring to FIG. 8 described above, when the cleaning path produced by the path map production unit is a cleaning path shown in FIGS. 8A and 8B, travels of the peripheral portion and the inner portion of the cleaning region are previously set as extension and retraction of the auxiliary cleaning tools 110, respectively.

Accordingly, the auxiliary cleaning tools 110 extend or retract in a travel path of the robot cleaner, regardless of the sensing results of the obstacle sensor 61.

Also, the robot cleaner 1 according to an embodiment travels about the peripheral portion of the cleaning region at a lower speed, when it travels about the inner portion of the cleaning region. The robot cleaner 1 may travel without using a map. When the robot cleaner 1 travels using a map, it stores the map along with the travel path as described above. The travel of the peripheral portion of the cleaning region in accordance with a wall tracing manner may be set by extending the auxiliary cleaning tools 110 and decreasing a travel speed of the robot cleaner 1, or controlling a predetermined reference value or less. In this case, the time at which auxiliary cleaning tools 110 stays in an area in which the wall contacts floor is lengthened and the robot cleaner can precisely clean even the edge.

Figure 15:
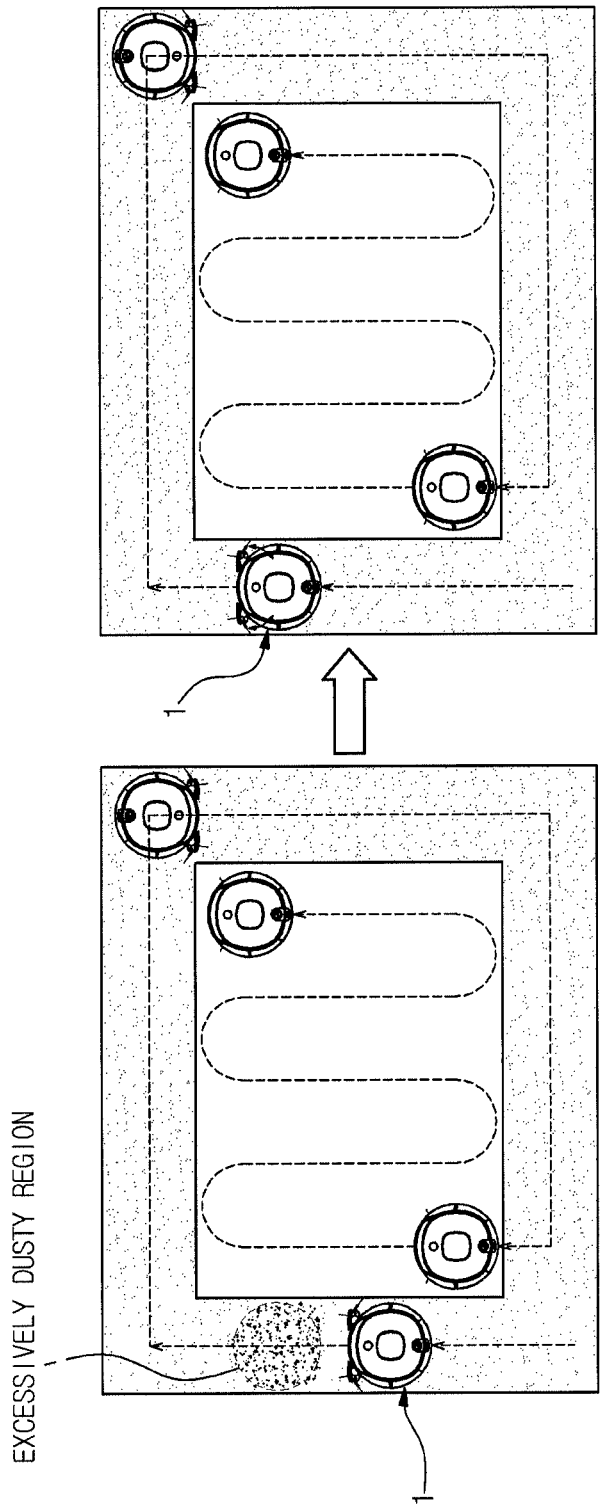
FIG. 15 is a view illustrating an operation of the robot cleaner illustrated in FIGS. 8A and 8B travelling in an excessively dusty region.

FIG. 15 is a view illustrating an operation of the robot cleaner 1 traveling in an excessively dusty region according to an embodiment.

In the robot cleaner 1 according to an embodiment, the sensing unit 60 may further include a dust sensor to sense the amount of dust. The dust sensor is mounted on a dust inlet 33 such that a light emitting unit to emit light faces a light receiving unit to receive light, and the amount of dust can be seen by analyzing a power signal of the dust sensor, since the amount of light received by the light-receiving portion is varied depending on the amount of dust.

As shown in FIG. 12, when the traveling robot cleaner 1 passes the excessively dusty region, extension and retraction operations of auxiliary cleaning tools 110 are repeated at predetermined intervals. Specifically, as the sensing results of the dust sensor are transported to the control unit 200 and are analyzed by the cleaning controller 210, when the dust amount is a predetermined reference value or higher, extension and retraction operations of the auxiliary cleaning tools 110 are repeated at predetermined intervals. The predetermined reference value is previously set by a user or a designer and the amount of dust that cannot be completely cleaned in a general cleaning mode may be set based on experiments or statistics.

The predetermined intervals at which extension and retraction operations of auxiliary cleaning tools 110 are repeated may be also predetermined by a user or a designer and, as the interval increases, efficiency of cleaning improves.

Like the embodiment above, when the auxiliary cleaning tool 110 repeats extension and retraction in the excessively dusty region, the auxiliary cleaning tool 110 informs a user of a dust-rich region and efficiently rakes or disperses dust.

Hereinafter, operation of the robot cleaner 1 according to an embodiment will be described.

The user wants to thoroughly clean even edges such as regions in which walls or obstacles contact the floor while cleaning using the robot cleaner 1 and often wants to clean the overall cleaning region within a short time.

Also, in a case in which many obstacles or walls are present in the cleaning region, when the robot cleaner is rapidly traveled by retracting auxiliary cleaning tools 110 is more efficient than when the edge is cleaned by extending the auxiliary cleaning tools 110.

Accordingly, the robot cleaner 1 according to an embodiment divides a cleaning mode into a first cleaning mode and a second cleaning mode and may carry out cleaning in another cleaning mode according to the user command or environments of the cleaning region.

Figure 16:
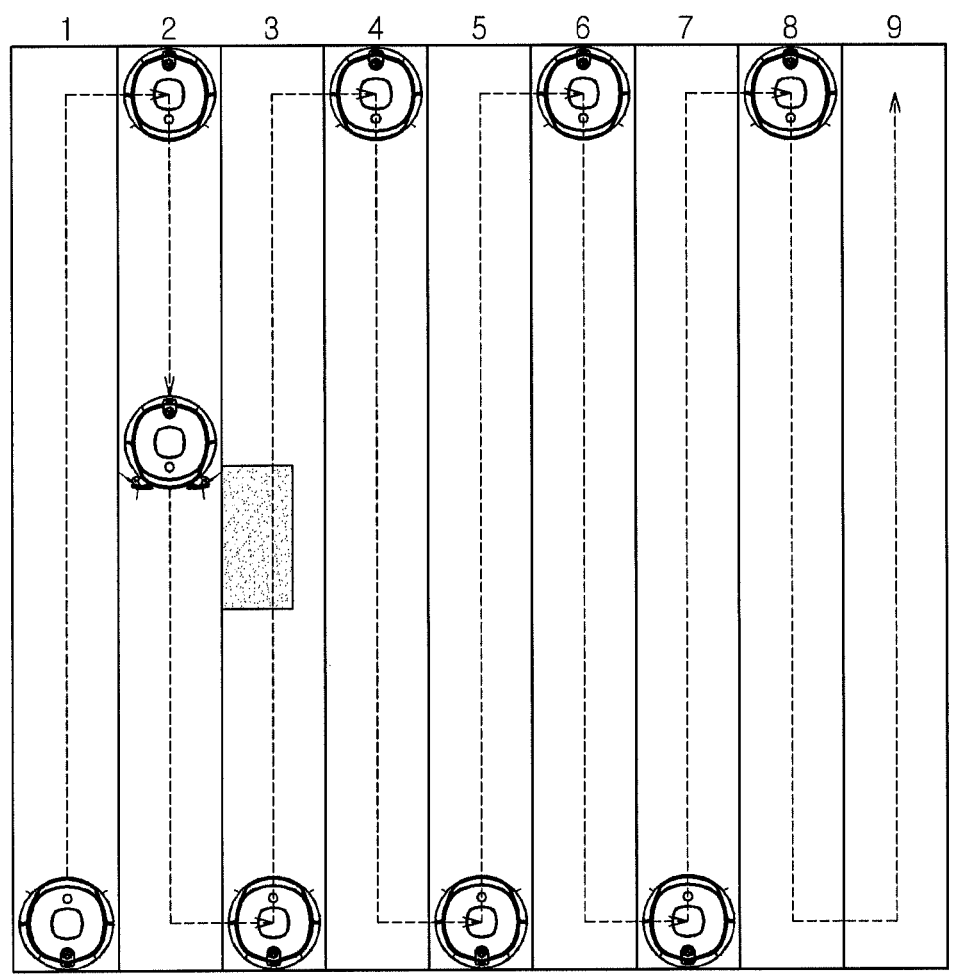
FIG. 16 is a plan view from above illustrating operations of the robot cleaner performing a cleaning operation in a first cleaning mode.
Figure 17:
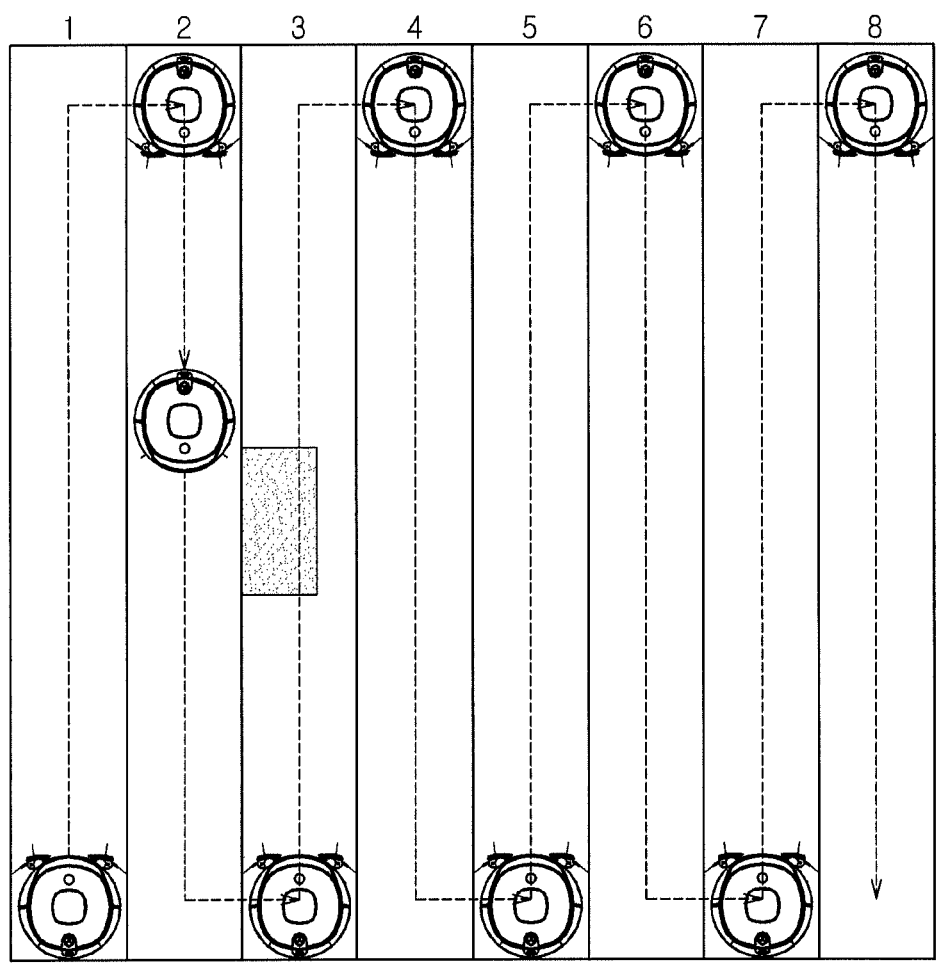
FIG. 17 is a plan view from above illustrating operations of the robot cleaner performing a cleaning operation in a second cleaning mode.

FIG. 16 is a plan view from above illustrating operations of the robot cleaner 1 cleaning in the first cleaning mode and FIG. 17 is a plan view from above illustrating operations of the robot cleaner 1 cleaning in the second cleaning mode.

Referring to FIG. 16, when the cleaning mode is set to the first cleaning mode and a basic travel pattern of the robot cleaner 1 is a zigzag manner, the robot cleaner 1 travels in a state in which the auxiliary cleaning tool 110 is retracted when the robot cleaner 1 does not meet with an obstacle, and the robot cleaner 1 cleans the edge at which the obstacle contacts the floor in a state in which the auxiliary cleaning tool 110 is extended when the robot cleaner 1 encounters an obstacle. At this time, the travel control unit 210 can perform more thorough cleaning by reducing the travel speed of the robot cleaner 1. Also, after the robot cleaner passes an obstacle, it retracts the auxiliary cleaning tools 110 and when the travel speed of the robot cleaner 1 is decreased, travel speed is increased again.

Referring to FIG. 17, when the cleaning mode is set to the second cleaning mode and a basic travel pattern of the robot cleaner 1 is a zigzag manner, the robot cleaner 1 cleans in a state in which the auxiliary cleaning tool 110 is extended when the robot cleaner 1 does not encounter an obstacle, and the robot cleaner 1 rapidly passes the obstacle without cleaning the edge in a state in which the auxiliary cleaning tool 110 is retracted ended and when the robot cleaner 1 encounters an obstacle. After the robot cleaner passes obstacles, the auxiliary cleaning tool 110 is extended again.

When the robot cleaner 1 travels based on the path map, the width of the travel path is set, while considering the size of the body so that complete cleaning is realized. Referring to FIGS. 16 and 17, since a cleaning region is considered in a state in which the auxiliary cleaning tools 110 are retracted, when cleaning is performed in the first cleaning mode, the width of travel path is narrowly set, and since the cleaning region is considered in a state in which auxiliary cleaning tools 110 are extended, when cleaning is performed in the second cleaning mode, the width of travel path is widely set.

Accordingly, although the predetermined region is cleaned, the first cleaning mode performs travelling along nine lines and the second cleaning mode performs travelling along eight lines. That is, the second cleaning mode enables rapider cleaning. Also, the second cleaning mode can more thoroughly clean a region having no obstacle, since the auxiliary cleaning tools 110 are extended in the region having no obstacle.

However, since the first cleaning mode can clean even the edge of obstacles, a user selects the first cleaning mode or the second cleaning mode via the input unit 70 and thereby performs desired cleaning.

Also, the robot cleaner 1 may autonomously select a cleaning mode. While the robot cleaner 1 test-travels the cleaning region to photograph surrounding images, it senses obstacles present in the cleaning region via the sensing unit 60, counts the number of obstacles in the cleaning controller 210 and sets the second cleaning mode when the number is the predetermined value or higher, and sets the first cleaning mode when the number is lower than the predetermined value.

A designer may set a predetermined reference value while taking into consideration efficiency of cleaning through experiments or statistics, and may set or change the value.

In the embodiment of FIGS. 16 and 17, the robot cleaner 1 travels about a cleaning region in a zigzag pattern, but any travel pattern other than the zigzag pattern may be used in the embodiment shown in FIGS. 16 and 17. In the embodiment of the present invention illustrated in FIGS. 8A and 8B, cleaning of an inner part of the cleaning region may be performed using the embodiment of FIGS. 16 and 17.

Also, like the embodiment of the present invention illustrated in FIGS. 8A and 8B, the embodiment illustrated in FIGS. 16 and 17 may also be used in all cases in which the travel path is determined by the map and in which the travel path is not determined by the map.

Also, although a case in which the robot cleaner 1 cleans in the first cleaning mode and the second cleaning mode is described in the embodiment of FIGS. 16 and 17, the robot cleaner 1 may clean in a third cleaning mode in which the auxiliary cleaning tools 110 are not extended.

The third cleaning mode is also selected through the input unit 70 or the sensing unit 60 senses an obstacle present in the cleaning region, the control unit 200 counts the number of obstacles, and the third cleaning mode is set when the obtained number of obstacles is the predetermined reference value or less. This case is based on the fact that sufficient cleaning is performed without extending the auxiliary cleaning tools 110, since many obstacles are not present in the cleaning region. Otherwise, when the obtained number of obstacles is the predetermined reference value or more, the third cleaning mode is set. This case is based on the fact that, when many obstacles are present in the cleaning region, extension and retraction operations of the auxiliary cleaning tools 110 are excessively frequently repeated and cleaning speed may thus be decreased or power may be wasted. The embodiment of FIGS. 16 and 17 includes both cases.

Also, the embodiment of the present invention may include all or a part of the first cleaning mode, the second cleaning mode and the third cleaning mode.

The embodiment of the present invention described in FIGS. 16 and 17 may also use extension and retraction operations of auxiliary cleaning tools 110 in the excessively dusty region, as in the embodiment of FIGS. 8A and 8B.

Figure 18A:
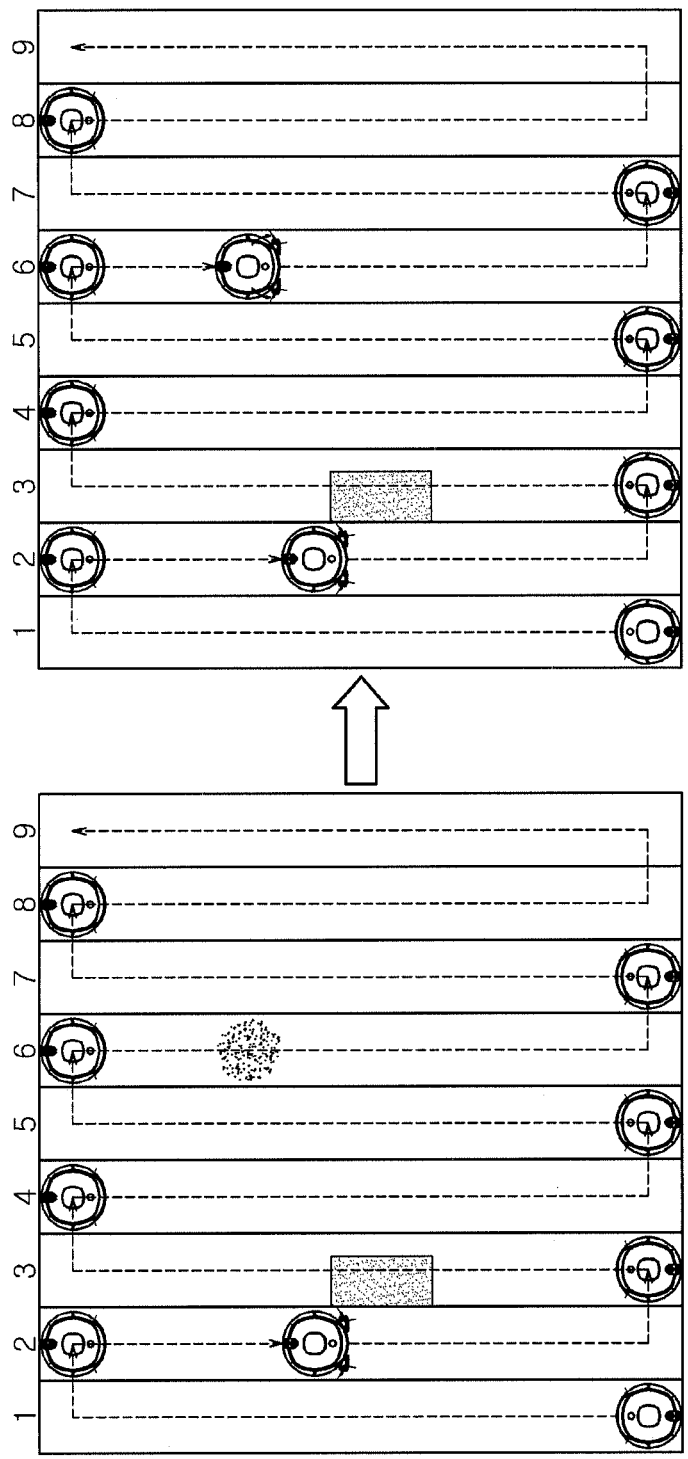
FIGS. 18A and 18B are plan views from above, illustrating operation of the robot cleaner according to an embodiment that enters an excessively dusty region.
Figure 18B:
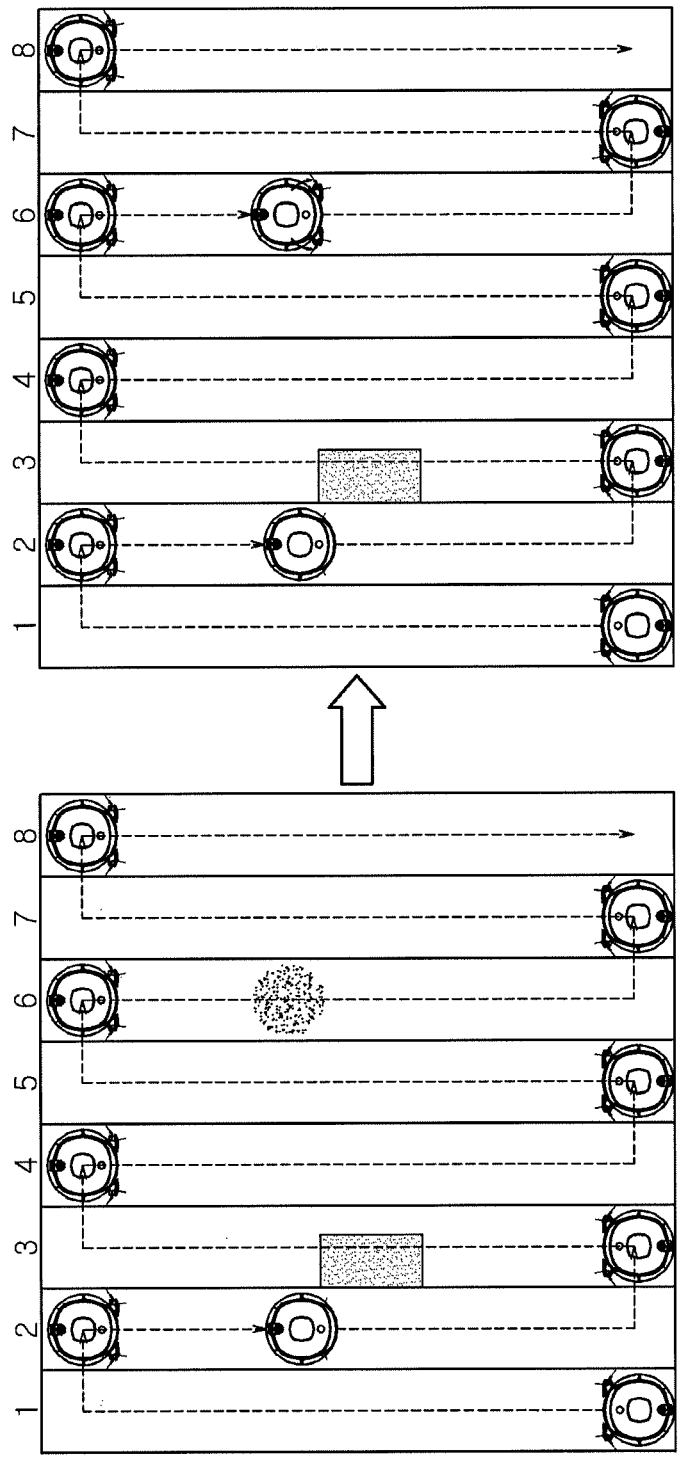

FIGS. 18A and 18B are plan views from above, illustrating operation of the robot cleaner 1 according to another embodiment of the present invention that enters an excessively dusty region.

Referring to FIGS. 18A and 18B, when the excessively dusty region is present in the travel path in all cases in which cleaning is performed in the first cleaning mode or the second cleaning mode, extension and retraction of auxiliary cleaning tools 110 are repeated at predetermined intervals while the robot cleaner 1 travels about the excessively dusty region, thereby efficiently sweeping or dispersing excess dust and informing a user of the excessively dusty region. As described above, the cleaning controller 210 controls such that auxiliary cleaning tools 110 repeat extension and retraction, when the amount of dust sensed by the dust sensor is a predetermined reference value or more.

Hereinafter, a method for controlling the robot cleaner 1 according to a embodiment will be described.

Figure 19:
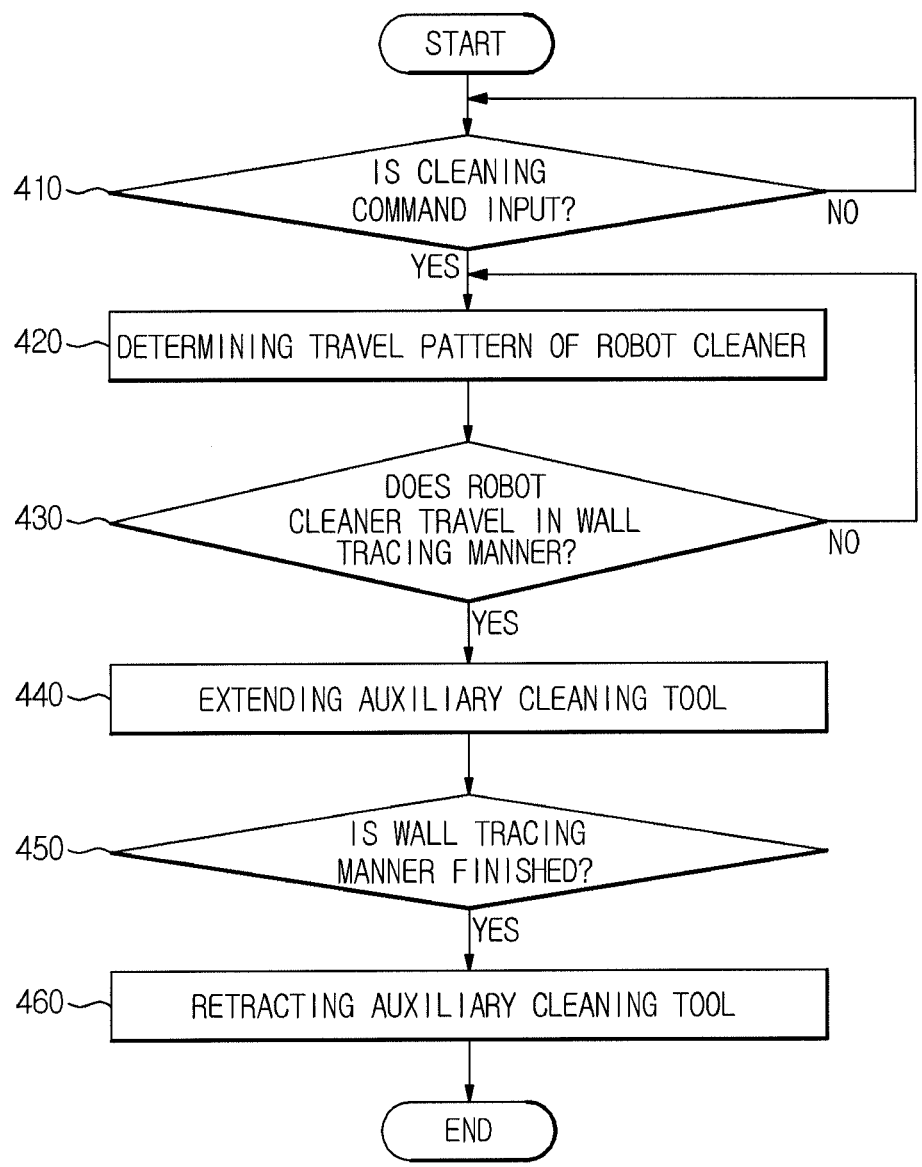
FIG. 19 is a flowchart illustrating a method for controlling the robot cleaner according to the embodiment described in FIGS. 8A and 8B.

FIG. 19 is a flowchart illustrating a method for controlling the robot cleaner 1 according to the embodiment described in FIGS. 8A and 8B.

Referring to FIG. 19, first, whether a cleaning start command is input is determined (410), and a travel pattern of the robot cleaner 1 is determined, when the cleaning start command is input (YES in 410) (420). The wall tracing travel means that travel is performed along the peripheral portion of the cleaning region.

As a result of determination, when the robot cleaner 1 travels in a wall tracing manner (YES in 430), the auxiliary cleaning tools 110 are extended outwardly of the body of the robot cleaner 1 (440). For this reason, the auxiliary cleaning tools 110 reach even the edge at which the wall contacts the floor and thorough cleaning can thus be performed.

At this time, all auxiliary cleaning tools 110 present at both sides of the robot cleaner 1 may be extended and only the auxiliary cleaning tool 110 present on the wall may be extended.

Also, when the robot cleaner 1 travels in a wall tracing manner, the travel speed may be adjusted to a relatively low level. Here, the term "relatively low level" means that the travel speed is lower than a basic travel speed or a travel speed of other travel pattern of the robot cleaner 1. By adjusting the travel speed to a low level, a time at which the auxiliary cleaning tool 110 stays in the edge is lengthened and thorough cleaning can thus be performed.

Whether or not wall tracing travel is finished is determined (YES in 450). As a result of determination, when the wall tracing travel is not finished, the auxiliary cleaning tool 110 keeps the extension state and when the wall tracing travel is finished, the auxiliary cleaning tool 110 is retracted (460).

In the embodiment above, the travel pattern of the robot cleaner 1 may include wall tracing as well as zigzag or random and travel of the robot cleaner 1 may be performed with or without a path map.

Figure 20:
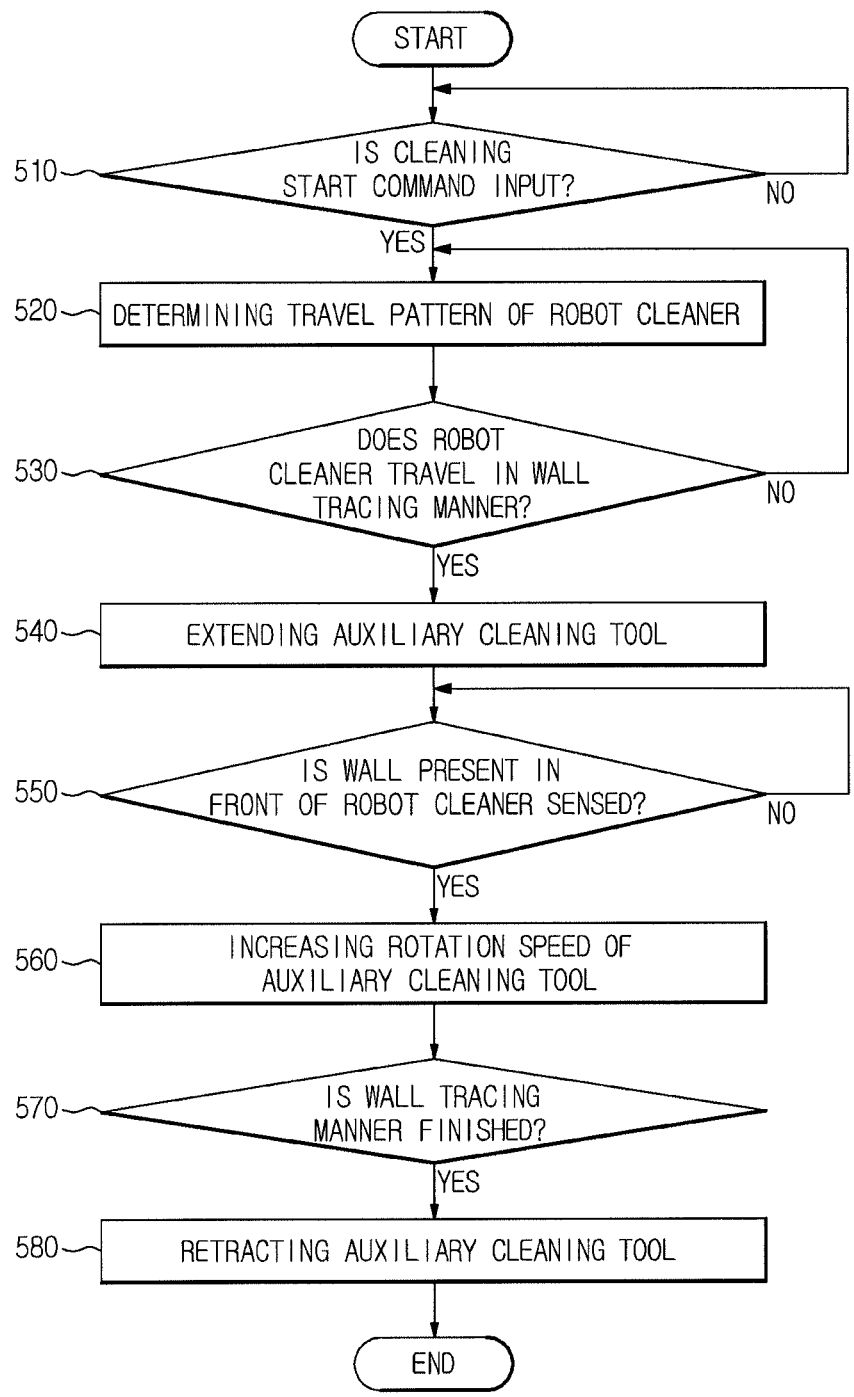
FIG. 20 is a flowchart illustrating a control method when the robot cleaner according to the embodiment described in FIGS. 8A and 8B faces the wall while travelling in a wall tracing manner.

FIG. 20 is a flowchart illustrating a control method when the robot cleaner 1 according to the embodiment described in FIGS. 8A and 8B faces the wall while travelling in a wall tracing manner.

The operations including determination as to whether or not a cleaning start command is input (510) to extension of the auxiliary cleaning tools 110 (540) are described in FIG. 19 above and a detailed description thereof will be thus omitted.

When the robot cleaner 1 senses presence of a wall in front thereof while travelling in a wall tracing manner (YES in 550), rotation speed of the auxiliary cleaning tools 110 is increased (560). As a result, the edge at which two walls intersect can be rapidly cleaned.

Also, when the wall tracing manner is finished (YES in 570), the auxiliary cleaning tool 110 is retracted (580).

Figure 21:
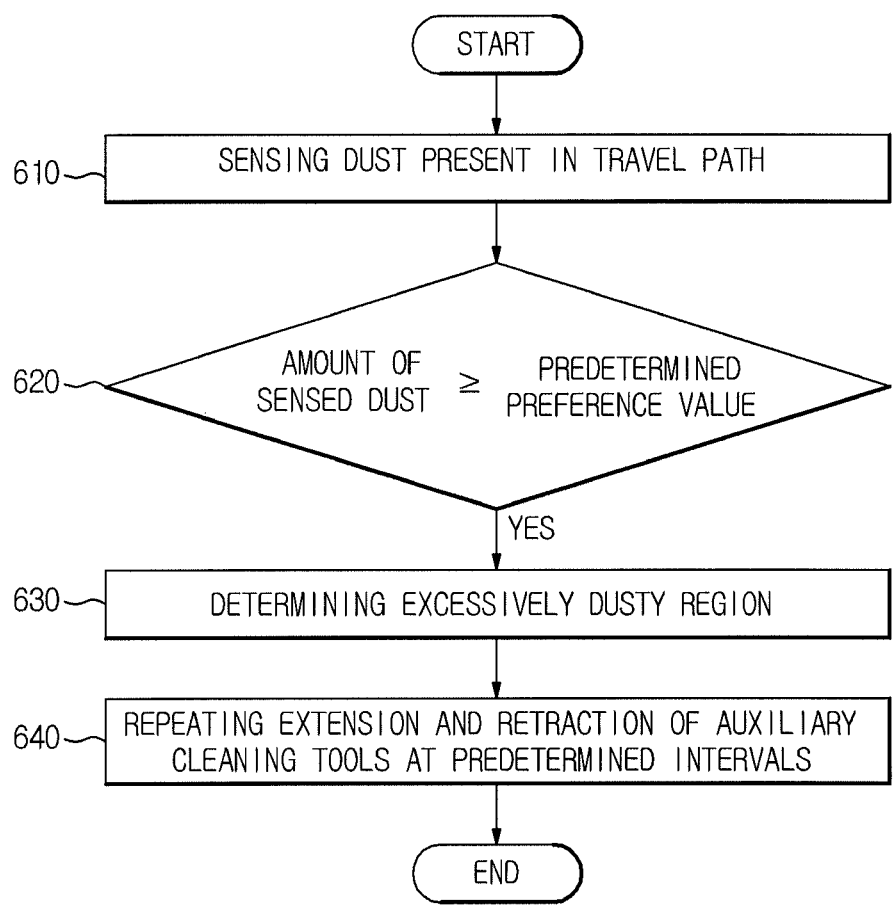
FIG. 21 is a flowchart briefly illustrating a control method when the robot cleaner according to the embodiment described in FIGS. 8A and 8B passes an excessively dusty region.

FIG. 21 is a flowchart briefly illustrating a control method when the robot cleaner 1 according to the embodiment described in FIGS. 8A and 8B passes an excessively dusty region.

The robot cleaner 1 senses dust present in a travel path (610). At this time, any travel path or cleaning mode of the robot cleaner 1 may be used without limitation. The sensing of dust is performed by a dust sensor present in the dust inlet 33.

Whether or not the amount of sensed dust is a predetermined reference value or more is determined (620). The amount of dust may be determined from an amount of light received by the light-receiving unit of the dust sensor and a user or designer can set a predetermined reference value through experiments or statistics.

As a result of determination, when the amount of sensed dust is a predetermined reference value or higher (YES in 620), the region is considered to be an excessively dusty region (630), and extension and retraction of auxiliary cleaning tools 110 are repeated at predetermined intervals (640). As a result, dust can be effectively swept, dispersed or wiped and the excessively dusty region may be informed of a user.

Figure 22:
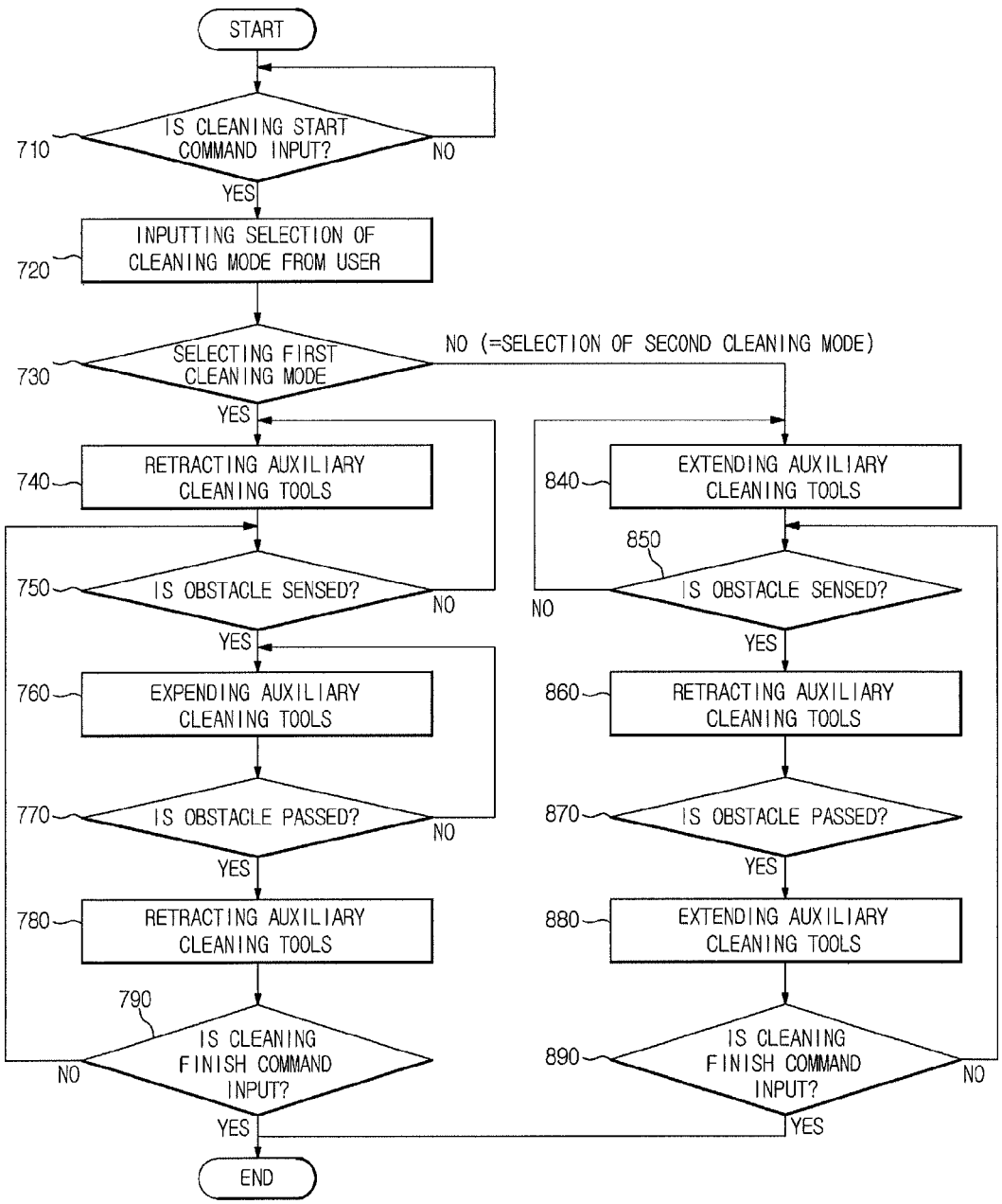
FIG. 22 is a flowchart illustrating a method for controlling the robot cleaner according to the embodiment described in FIGS. 18A and 18B.

FIG. 22 is a flowchart illustrating a method for controlling the robot cleaner according to the embodiment described in FIGS. 18A and 18B.

In the method for controlling the robot cleaner according to the embodiment of FIGS. 18A and 18B, the first cleaning mode or second cleaning mode is set based on user commands and obstacle sensing results. In the embodiment of FIG. 22, the cleaning mode is set based on the user command.

Referring to FIG. 22, first, whether or not a cleaning start command is input is determined (710), and selection of the cleaning mode is input from a user when the cleaning start command is input (YES in 710) (720).

When the user selects a first cleaning mode (YES in 720), the auxiliary cleaning tool 110 is retracted (740). Also, the robot cleaner travels in a predetermined travel pattern or a random manner and presence of an obstacle around the robot cleaner 1 is determined (750). At this time, the obstacle may be present in front or rear of the robot cleaner 1.

When an obstacle is determined to be present around the robot cleaner 1 (YES in 750), the auxiliary cleaning unit is extended (760). As a result, the edge at which the obstacle contacts the floor can also be thoroughly cleaned.

Also, after the robot cleaner 1 passes the obstacle (YES in 770), the auxiliary cleaning tool 110 is retracted again (780).

Unless a cleaning finish command is input (NO in 790), obstacle sensing is determined again and the following process is repeated.

When the user selects the second cleaning mode (NO in 730), the auxiliary cleaning tool 110 is extended (840). The extended auxiliary cleaning tool 110 cleans a wide area of the cleaning region, not edge regions.

When an obstacle is determined to be present around the robot cleaner 1 (YES in 850), the auxiliary cleaning tool 110 is retracted again (860). As a result, rapid cleaning can be performed throughout the cleaning region.

Also, after the robot cleaner 1 passes an obstacle (YES in 870), the auxiliary cleaning tool 110 is extended again (880). Also, unless a cleaning finish command is input (NO in 890), the robot cleaner 1 determines whether or not the robot cleaner 1 senses the obstacle during travel and repeats the following operations.

When a cleaning mode is set according to obstacle sensing results, the robot cleaner 1 senses obstacles present in the cleaning region during test travel for setting the map and calculates the number of obstacles, based on the sensing results. When the number of calculated obstacles is a predetermined reference value or more, the second cleaning mode in which cleaning is performed throughout the cleaning region, rather than the edge of the obstacle is set and cleaning is controlled according to the second cleaning mode as shown in FIG. 22.

When the number of calculated obstacles is smaller than a predetermined reference value, a first cleaning mode in which cleaning is performed in the edge of the obstacle is set and cleaning is controlled according to the first cleaning mode as shown in FIG. 22.

As described in FIG. 19, control of the robot cleaner in the excessively dusty region may be applied in any travel mode or cleaning mode and may also be applied to a method for controlling the robot cleaner according to the embodiment of FIGS. 18A and 18B. Accordingly, the dust sensor senses dust in a travel path according to the first cleaning mode or second cleaning mode during travel and, when the amount of sensed dust is a predetermined reference value or more, extension and retraction of the auxiliary cleaning tool 110 are repeated at predetermined intervals, thereby efficiently removing dust and informing a user of the same.

Although the auxiliary cleaning tools 110 are realized in the form of a brush and perform cleaning by sweeping or dispersing foreign matter such as dust in the aforementioned embodiments, when auxiliary cleaning tools 110 are realized in the form of a floorcloth, they perform cleaning by wiping foreign matter with the floorcloth, and when auxiliary cleaning tools 110 are realized in the form of a suction device, they perform cleaning by absorbing foreign matter. The type or cleaning method of the auxiliary cleaning tools 110 is not limited and various embodiments may be used.

In a robot cleaner and a control method for the same according to embodiments of the present disclosure, an auxiliary cleaning tool is extended when the robot cleaner travels in a wall tracing manner, to efficiently clean portions, which a main brush does not reach, such as portions in which obstacles or walls contact the floor or portions in which wall surfaces contact one another, and the auxiliary cleaning tool is retracted while the robot cleaner travels inside the cleaning region in a wall tracing manner to improve efficiency of cleaning.

Also, in a robot cleaner and a control method for the same according to one aspect, extension and retraction of auxiliary cleaning tools are controlled according to user commands or environments of cleaning regions. As a result, cleaning that satisfies the user commands or environments of cleaning regions can be realized.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A robot cleaner for removing foreign matter from a floor while traveling on the floor, comprising:
   a body;
   a main brush unit mounted to a bottom of the body of the robot cleaner;
   a plurality of auxiliary cleaning units mounted to the bottom of the body of the robot cleaner, each being protrudable outward from the body of the robot cleaner to a protruded position and retractable into the body of the robot cleaner to a retracted position; and
   a control unit configured to
      control the robot cleaner to travel in a wall tracing manner of travel along a periphery of a cleaning region, and
      extend at least one of the auxiliary cleaning units from the retracted position thereof to the protruded position thereof in response to determining that the robot cleaner has been set to travel in the wall tracing manner of travel.

2. The robot cleaner according to claim 1, wherein
the control unit extends only an auxiliary cleaning unit present on a wall surface from among the auxiliary cleaning units from the retracted position thereof to the protruded position thereof, in response to determining that the robot cleaner has been set to travel in the wall tracing manner.

3. The robot cleaner according to claim 1, wherein
the control unit controls a speed of the robot cleaner when traveling in the wall tracing manner to be lower than another speed of the robot cleaner when travelling in an inner portion of the cleaning region.

4. The robot cleaner according to claim 1, further comprising:
an obstacle sensor to sense an obstacle in the cleaning region of the robot cleaner.

5. The robot cleaner according to claim 1, further comprising:
a dust sensing unit comprising an optical sensor that senses dust present on the floor of the cleaning region.

6. The robot cleaner according to claim 1, wherein the control unit increases a cleaning speed of the auxiliary cleaning units, in response to an obstacle sensor of the robot cleaner detecting a wall disposed in front thereof while the robot cleaner is travelling in the wall tracing manner.

7. The robot cleaner according to claim 5, wherein the control unit repeats extension and retraction of the auxiliary cleaning units at predetermined intervals when an amount of dust sensed by the dust sensing unit is greater than or equal to a predetermined reference value.

8. The robot cleaner according to claim 1, wherein the control unit extends the auxiliary cleaning unit into an inner portion of the cleaning region in response to detecting an obstacle within the inner portion of the cleaning region to clean around the edge of the obstacle.

9. The robot cleaner according to claim 1, wherein the control unit controls a cleaning speed of the auxiliary cleaning unit to increase or decrease a cleaning time.

10. The robot cleaner according to claim 1, wherein
the control unit retracts the at least one of the auxiliary cleaning units to the retracted position thereof in response to the robot cleaner switching from traveling in the wall tracing manner along the periphery of the cleaning region to travelling in an inner portion of the cleaning region.

11. A method for controlling a robot cleaner comprising a main brush unit, and auxiliary cleaning units each being protrudable outward from a body of the robot cleaner to a protruded position and retractable into the body of the robot cleaner to a retracted position, the method comprising:
determining whether or not the robot cleaner has been set to travel in a wall tracing manner of travel along a periphery of a cleaning region;
outwardly extending at least one of the auxiliary cleaning units from the retracted position thereof to the protruded position thereof, in response to determining that the robot cleaner has been set to travel in the wall tracing manner of travel;
determining whether the robot cleaner is no longer travelling in the wall tracing manner of travel; and
retracting the at least one auxiliary cleaning units to the retracted position thereof in response to determining that the robot cleaner is no longer travelling in the wall tracing manner of travel.

12. The method according to claim 11, wherein the outwardly extending comprises:
extending only one auxiliary cleaning unit, among the auxiliary cleaning units, that is present on a wall surface, from the retracted position thereof to the protruded position thereof in response to determining that the robot cleaner has been set to travel in the wall tracing manner.

13. The method according to claim 11, wherein the robot cleaner comprises a control unit that controls a speed of the robot cleaner when traveling in the wall tracing manner to be lower than another speed of the robot cleaner when traveling in an inner portion of a cleaning region to be cleaned by the robot.

14. The method according to claim 11, further comprising:
sensing obstacles disposed in front of the robot cleaner,
increasing a cleaning speed of the auxiliary cleaning units is increased, in response to a wall disposed in front of the robot cleaner being sensed while the robot cleaner is travelling in the wall tracing manner.

15. The method according to claim 11, further comprising:
sensing dust disposed in a cleaning region to be cleaned by the robot; and
repeating extension and retraction of the auxiliary cleaning units at predetermined intervals when an amount of dust sensed by the dust sensing unit is greater than or equal to a predetermined reference value.

16. The method according to claim 11, wherein the robot cleaner comprises a control unit configured to extend the at least one of the auxiliary cleaning units from the retracted position thereof to the protruded position thereof in response to detecting that an obstacle is present in a cleaning region to be cleaned by the robot.

* * * * *